(12) United States Patent
Furuichi

(10) Patent No.: US 11,510,049 B2
(45) Date of Patent: Nov. 22, 2022

(54) CONTROL DEVICE, METHOD, AND RECORDING MEDIUM

(71) Applicant: SONY CORPORATION, Tokyo (JP)

(72) Inventor: Sho Furuichi, Tokyo (JP)

(73) Assignee: SONY CORPORATION, Tokyo (JP)

(*) Notice: Subject to any disclaimer, the term of this patent is extended or adjusted under 35 U.S.C. 154(b) by 63 days.

(21) Appl. No.: 16/623,495

(22) PCT Filed: Apr. 6, 2018

(86) PCT No.: PCT/JP2018/014704
§ 371 (c)(1),
(2) Date: Dec. 17, 2019

(87) PCT Pub. No.: WO2019/003555
PCT Pub. Date: Jan. 3, 2019

(65) Prior Publication Data
US 2020/0228963 A1 Jul. 16, 2020

(30) Foreign Application Priority Data

Jun. 26, 2017 (JP) .............................. JP2017-123952

(51) Int. Cl.
*H04W 8/22* (2009.01)
*H04W 16/14* (2009.01)
(Continued)

(52) U.S. Cl.
CPC ............. *H04W 8/22* (2013.01); *H04W 16/14* (2013.01); *H04W 24/10* (2013.01); *H04W 72/0453* (2013.01)

(58) Field of Classification Search
CPC ... H04W 8/22; H04W 24/10; H04W 72/0453; H04W 16/14
(Continued)

(56) References Cited

U.S. PATENT DOCUMENTS 9,456,392 B2* 9/2016 Nakamori ......... H04W 36/0094
10,172,012 B2* 1/2019 Furuichi ............. H04W 64/006
(Continued)

FOREIGN PATENT DOCUMENTS

CN 101990290 A 3/2011
CN 102714816 A 10/2012
(Continued)

OTHER PUBLICATIONS

"White Space Devices(WSD); Wireless Access Systems Operating in the 470 MHz to 790 MHz Tv Broadcast Band; Harmonized EN Covering the Essentials Requirements of Article 3.2 of the R&TTE Directive", Harmonized European Standard, ETSI EN 301 598 V1.1.1, Apr. 2014, 72 pages.
(Continued)

*Primary Examiner* — Congvan Tran
(74) *Attorney, Agent, or Firm* — Chip Law Group

(57) ABSTRACT

Proposed is a mechanism capable of secondary usage of narrow-band frequency channels. A control device includes a control unit configured to perform division processing of dividing a first frequency band indicated by a frequency supervising database as a frequency band that can be used by at least one communication node, into a plurality of second frequency bands, on the basis of capability information of the communication node and information indicating a measurement result by the communication node.

13 Claims, 24 Drawing Sheets

(51) Int. Cl.
*H04W 24/10* (2009.01)
*H04W 72/04* (2009.01)

(58) Field of Classification Search
USPC .................................................. 370/328, 329
See application file for complete search history.

(56) References Cited

U.S. PATENT DOCUMENTS

| | | | | |
|---|---|---|---|---|
| 2004/0235485 | A1* | 11/2004 | Tanaka | H04W 16/10 455/447 |
| 2011/0028179 | A1 | 2/2011 | Sawai et al. | |
| 2012/0178465 | A1 | 7/2012 | Lin et al. | |
| 2014/0341144 | A1* | 11/2014 | Zhang | H04W 72/0413 370/329 |
| 2015/0036514 | A1* | 2/2015 | Zhu | H04W 52/244 370/252 |
| 2015/0148054 | A1 | 5/2015 | Futaki et al. | |
| 2015/0312778 | A1* | 10/2015 | Chandrasekhar | H04W 24/04 455/419 |
| 2015/0333853 | A1* | 11/2015 | Sawai | H04B 17/354 455/423 |
| 2017/0041801 | A1* | 2/2017 | Liu | H04W 16/10 |
| 2017/0055262 | A1* | 2/2017 | Nakamura | H04W 72/0453 |
| 2017/0118089 | A1* | 4/2017 | Hur | H04W 52/02 |
| 2017/0215084 | A1 | 7/2017 | Futaki et al. | |

FOREIGN PATENT DOCUMENTS

| | | |
|---|---|---|
| CN | 104285461 A | 1/2015 |
| CN | 105075312 A | 11/2015 |
| CN | 106851721 A | 6/2017 |
| EP | 2843982 A1 | 3/2015 |
| EP | 2961214 A1 | 12/2015 |
| JP | 2011-166721 A | 8/2011 |
| JP | 5679033 B2 | 3/2015 |
| JP | 5687360 B2 | 3/2015 |
| JP | 6172144 B2 | 8/2017 |
| JP | 6402808 B2 | 10/2018 |
| TW | 201230833 A | 7/2012 |
| WO | 2012/094983 A1 | 7/2012 |
| WO | 2013/161136 A1 | 10/2013 |
| WO | 2014/129035 A1 | 8/2014 |

OTHER PUBLICATIONS

International Search Report and Written Opinion of PCT Application No. PCT/JP2018/014704, dated Jun. 19, 2018, 09 pages of ISRWO.

"White Space Devices (WSD); Wireless Access Systems operating in the 470 MHz to 790 MHz TV broadcast band; Harmonized EN covering the essential requirements of article 3.2 of the R&TTE Directive", ETSI EN 301 598 V1.1.1, Apr. 2014, 72 pages.

Extended European Search of EP Application No. 18823187.2, dated May 11, 2020, 07 pages.

Office Action for JP Patent Application No. 2019-526162, dated Apr. 12, 2022, 02 pages of English Translation and 02 pages of Office Action.

* cited by examiner

CONTROL DEVICE, METHOD, AND RECORDING MEDIUM

CROSS REFERENCE TO RELATED APPLICATIONS

This application is a U.S. National Phase of International Patent Application No. PCT/JP2018/014704 filed on Apr. 6, 2018, which claims priority benefit of Japanese Patent Application No. JP 2017-123952 filed in the Japan Patent Office on Jun. 26, 2017. Each of the above-referenced applications is hereby incorporated herein by reference in its entirety.

TECHNICAL FIELD

The present disclosure relates to a control device, a base station, a terminal device, a method, and a recording medium.

BACKGROUND ART

In recent years, a wide variety of wireless systems such as cellular networks, wireless local area networks (LANs), TV broadcast systems, satellite communication systems, and program making special events (PMSEs) have become widespread. In order to operate each wireless system correctly, it is desirable to manage frequency resources to be used such that interference does not occur between individual wireless systems. This similarly applies between local networks included in one wireless system.

With regard to management of frequency resources, frequency sharing is being considered as one of the measures to alleviate the future exhaustion of the frequency resources. For example, a mechanism for allowing a frequency channel assigned to a certain wireless system to be temporarily used by another wireless system has been considered. Such a mechanism may also be referred to as secondary usage of frequency. In general, a system to which a frequency channel is preferentially assigned is called a primary system, and a system that secondarily uses the frequency channel is called a secondary system.

As an example of an approach relating to the secondary usage of frequencies, Non Patent Document 1 below describes laws and regulations relating to secondary usage of digital television frequency bands in Europe. A digital television frequency band 470 to 790 MHz in Europe is divided into a total of 60 channels of an 8 MHz width (channelization). A white space device (WSD) that secondarily uses the frequency channel is required to satisfy the requirements described in Non Patent Document 1 below.

Many techniques for properly managing frequency resources have been developed. For example, Patent Document 1 below discloses a technique for suppressing a case where communication by a base station causes interference by assigning frequencies in accordance with a position of the base station.

CITATION LIST

Patent Document

Patent Document 1: Japanese Patent No. 5679033

Non Patent Document

Non Patent Document 1: ETSI EN 301 598, "White Space Devices (WSD); Wireless Access Systems operating in the 470 MHz to 790 MHz TV broadcast band; Harmonized EN covering the essential requirements of article 3.2 of the R&TTE Directive",V1.1.1,2014

SUMMARY OF THE INVENTION

Problems to be Solved by the Invention

According to Non Patent Document 1 above, a total of 60 channels obtained by dividing the 8 MHz width are defined. However, considering the explosive increase in communication devices accompanying the advent of Internet of Things (IoT) devices, the fact that various radio access technologies (RATs) can coexist, and the like, it is preferable that secondary usage of the frequency channel can be performed more flexibly. In Patent Document 1 above, the proposal of the technique that contributes to this point has been insufficient.

Accordingly, the present disclosure proposes a mechanism that enables secondary usage of narrow-band frequency channels.

Solutions to Problems

According to the present disclosure, there is provided a control device including a control unit configured to perform division processing of dividing a first frequency band indicated by a frequency supervising database as a frequency band that can be used by at least one communication node, into a plurality of second frequency bands, on the basis of capability information of the communication node and information indicating a measurement result by the communication node.

Furthermore, according to the present disclosure, there is provided a base station that communicates with a terminal device. The base station includes a control unit configured to notify a control device of capability information of the terminal device, and acquire, from the control device, information indicating a result of division processing of dividing a first frequency band indicated by a frequency supervising database as a frequency band that can be used by the base station, into a plurality of second frequency bands, to notify the terminal device.

Furthermore, according to the present disclosure, there is provided a terminal device that communicates with a base station. The terminal device includes a control unit configured to: acquire information indicating a result of division processing of dividing a first frequency band indicated by a frequency supervising database as a frequency band that can be used by the base station, into a plurality of second frequency bands; perform measurement processing on at least one of the plurality of second frequency bands; and report information indicating a measurement result to the base station.

Furthermore, according to the present disclosure, there is provided a method to be executed by a processor. The method includes performing division processing of dividing a first frequency band indicated by a frequency supervising database as a frequency band that can be used by at least one communication node, into a plurality of second frequency bands, on the basis of capability information of the communication node and information indicating a measurement result by the communication node.

Furthermore, according to the present disclosure, there is provided a method to be executed by a base station that communicates with a terminal device. The method includes notifying a control device of capability information of the terminal device, and acquiring, from the control device, information indicating a result of division processing of dividing a first frequency band indicated by a frequency supervising database as a frequency band that can be used by the base station, into a plurality of second frequency bands, to notify the terminal device.

Furthermore, according to the present disclosure, there is provided a method to be executed by a terminal device that communicates with a base station. The method includes: acquiring information indicating a result of division processing of dividing a first frequency band indicated by a frequency supervising database as a frequency band that can be used by the base station, into a plurality of second frequency bands; performing measurement processing on at least one of the plurality of second frequency bands; and reporting information indicating a measurement result to the base station.

Furthermore, according to the present disclosure, there is provided a recording medium that has recorded a program for causing a computer to function as a control unit configured to perform division processing of dividing a first frequency band indicated by a frequency supervising database as a frequency band that can be used by at least one communication node, into a plurality of second frequency bands, on the basis of capability information of the communication node and information indicating a measurement result by the communication node.

Furthermore, according to the present disclosure, there is provided a recording medium that has recorded a program for causing a computer to function as a control unit configured to notify a control device of capability information of a terminal device, and acquire, from the control device, information indicating a result of division processing of dividing a first frequency band indicated by a frequency supervising database as a frequency band that can be used by a base station that communicates with the terminal device, into a plurality of second frequency bands, to notify the terminal device.

Furthermore, according to the present disclosure, there is provided a recording medium that has recorded a program for causing a computer to function as a control unit configured to: acquire information indicating a result of division processing of dividing a first frequency band indicated by a frequency supervising database as a frequency band that can be used by a base station, into a plurality of second frequency bands; perform measurement processing on at least one of the plurality of second frequency bands; and report information indicating a measurement result to the base station.

Effects of the Invention

As described above, according to the present disclosure, a mechanism capable of secondary usage of narrow-band frequency channels is provided. Note that the effect above is not necessarily limited, and in addition to the effect above or instead of the effect above, any of the effects described in this specification, or other effects that may be understood from the present specification may be exhibited.

MODE FOR CARRYING OUT THE INVENTION

Figure 1:
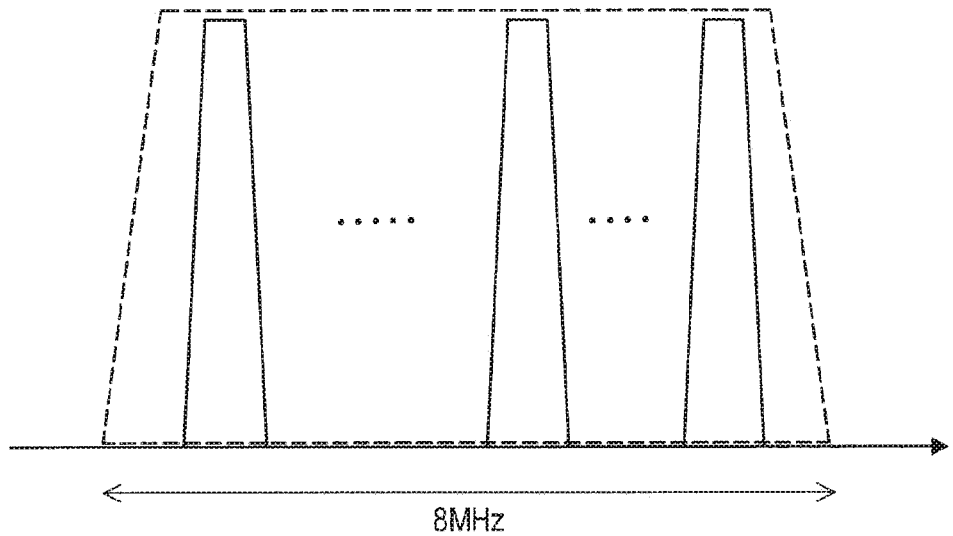
FIG. 1 is a view for explaining a narrow-band WSD according to an embodiment of the present disclosure.

Hereinafter, a preferred embodiment of the present disclosure will be described in detail with reference to the accompanying drawings. Note that, in this specification and the drawings, components having substantially the same functional configuration are denoted by the same reference numerals, and redundant explanations are omitted.

Furthermore, in this specification and the drawings, elements having substantially the same functional configuration may be distinguished by appending different alphabets to the same reference numerals in some cases. For example, a plurality of elements having substantially the same functional configuration is distinguished as required, such as CRSs 300A, 300B, and 300C. However, in a case where it is not necessary to distinguish each of a plurality of elements having substantially the same functional configuration, only the same reference numerals will be given. For example, in a case where it is not necessary to particularly distinguish the CRSs 300A, 300B and 300C, these are simply referred to as a CRS 300.

Note that the description will be made in the following order.
1. Introduction
1.1. Narrow-band frequency channel
1.2. Definition of terms
2. Configuration example
2.1. Logical configuration example
2.2. Physical configuration example
2.3. logical functional configuration
3. Technical features
3.1. Subchannelization
3.2. Flow of processing
4. Implementation example
5. Application example
6. Conclusion <<1. Introduction>>
<1.1. Narrow-Band Frequency Channel>

According to Non Patent Document 1 above, the digital television frequency band 470 to 790 MHz in Europe is divided into a total of 60 channels of an 8 MHz width (channelization). A WSD that secondarily uses the frequency channel is required to satisfy the requirements described in Non Patent Document 1 above. One of the requirements is specification of a spectrum mask. According to such the specification, even in a case of a WSD that operates in a narrower band than 8 MHz (hereinafter, a narrow-band WSD), it is sufficient to satisfy the same requirements.

FIG. 1 is a view for explaining the narrow-band WSD according to an embodiment of the present disclosure. In a case where the narrow-band WSD satisfies the same requirements as a WSD that operates in 8 MHz (hereinafter also referred to as a normal-band WSD), a center frequency of a spectrum used by the narrow-band WSD need not match a center frequency of any of 60 channels defined in advance. Therefore, a scenario can be assumed that in which a plurality of narrow-band WSD spectrums exists in one channel of the 8 MHz frequency channel, as shown in FIG. 1.

However, at present, a frequency channel assignment mechanism considering such a narrow-band WSD is not defined in both the laws and the standards. The frequency channel assignment mechanism considering a narrow-band WSD is, specifically, a channelization mechanism for a narrow-band WSD (hereinafter also referred to as subchannelization), and a provision mechanism of available frequency information based on subchannelization.

For the subchannelization mechanism, it is also considered possible to implement means to fixedly determine channelization within the 8 MHz bandwidth. However, an operating bandwidth of the narrow-band WSD depends on a RAT provided to the narrow-band WSD. Therefore, in order to support various RATs, it is desirable to provide a mechanism that can flexibly perform subchannelization.

With regard to the provision mechanism of available frequency information based on subchannelization, available frequency information corresponding to subchannelization is desirably provided. At present, the available frequency information provided for the normal-band WSD does not correspond to subchannelization. Therefore, assuming that narrow-band WSD is provided with available frequency information for the normal-band WSD, each of the plurality of narrow-band WSDs is to arbitrarily determine a center frequency, and there is a possibility that critical interference frequently occurs between the narrow-band WSDs. Therefore, in order to suppress the frequency of occurrence of such critical interference, it is desirable that available frequency information corresponding to subchannelization is provided.

The present disclosure provides a subchannelization mechanism and a provision mechanism of available frequency information based on subchannelization.

<1.2. Definition of Terms>

A wireless system to which a frequency channel is primarily assigned is referred to as a primary system. The primary system is, for example, a cellular network, a wireless LAN, a TV broadcast system, a satellite communication system, a PMSE, and the like. Here, the wireless system is a concept including a system that transmits radio in a single direction and a system that transmits (i.e., communicates) radio in both directions. The primary system may also be referred to as an incumbent system.

A wireless system that operates by secondarily using a frequency is also referred to as a secondary system. The secondary system is, for example, a WSD or the like. Alternatively, for example, a macro cell in a cellular network may be referred to as a primary system, and a small cell using the same frequency in or out of coverage thereof may also be referred to as a secondary system.

A communication device that operates by secondarily using a frequency is referred to as a communication node. The communication node includes, for example, a base station and a terminal device that communicates with the base station. In a case where there is no need to distinguish between a normal-band node and a narrow-band node as described later, they are also collectively referred to as a communication node. A communication node according to the present embodiment is typically included in a cognitive wireless system (CRS). The CRS is a system that controls a parameter (e.g., frequency) used for transmission and reception on the basis of a wireless environment, and is classified into a heterogeneous type and a frequency-shared type. In the heterogeneous CRS, the communication node measures radio wave quality and the like, and controls a parameter on the basis of a result thereof. In the frequency-shared CRS, the communication node selects a parameter to be used from available parameters corresponding to a place or time, on the basis of control by a frequency supervising server as described later. The communication node according to the present embodiment is included in the frequency-shared CRS. The communication node according to the present embodiment may be classified into other than the CRS as long as it operates on the basis of control by a frequency supervising server as described later.

In a frequency band where secondary usage is performed, a communication node that operates using a frequency channel defined by channelization specified by the laws, standards, or the like (hereinafter also referred to as a normal-band channel) is a normal-band node. For example, WSDs that operate in the TV frequency band channel width 8 MHz in Europe and WSDs that operate in the TV frequency band channel width 6 MHz in the US are usually included in the normal-band node.

In a frequency band where secondary usage is performed, a communication node that operates using a frequency channel defined by subchannelization (hereinafter also referred to as a narrow-band channel or a subchannel) is a narrow-band node. Note that a bandwidth of the narrow-band channel is less than a bandwidth of the normal-band channel.

A database for controlling frequency secondary usage is to be the frequency supervising database. The white space database (WSDB), which is a database for television white space frequency spectrum (TVWS) in the UK, is an example of the frequency supervising database. Furthermore, the database spectrum access system (SAS) in 47C. F. R Part 96 citizens broadband radio service (CBRS) enforced by the US federal communications commission (FCC) is also an example of the frequency supervising database. In a case where a macro cell is set to a primary system and a small cell is set to a secondary system, a device that controls the small cell so as not to cause critical interference to the macro cell may also be an example of the frequency supervising database.

<<2. Configuration Example>>

<2.1. Logical Configuration Example>

Figure 2:
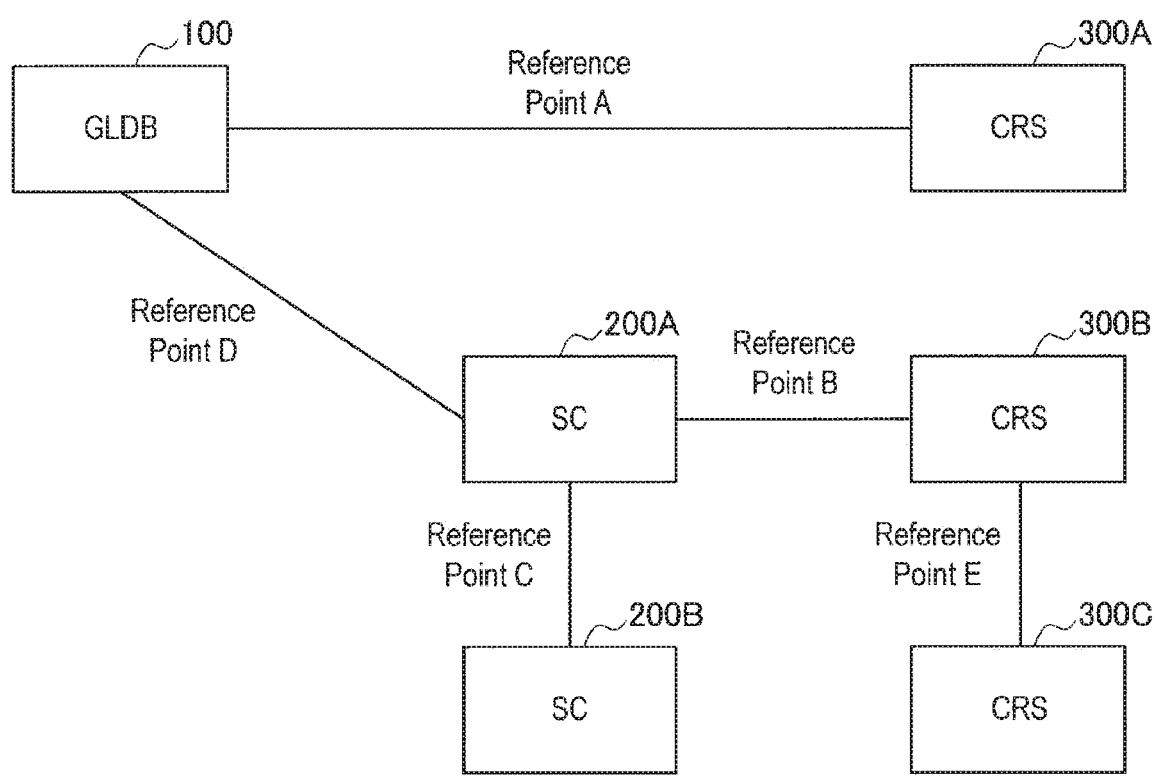
FIG. 2 is a diagram for explaining an example of a logical configuration of a system according to the present embodiment.

FIG. 2 is a diagram for explaining an example of a logical configuration of a system 1 according to the present embodiment. As shown in FIG. 2, the system 1 according to the present embodiment includes a geolocation database (GLDB) 100, a spectrum coordinator (SC) 200, and the CRS 300. These entities may be mapped to mutually different physical devices, or may be mapped to a same device. The GLDB 100 is connected to at least one of the SC 200 or the CRS 300. The SC 200 is connected to at least one of the GLDB 100, another SC 200, or the CRS 300. The CRS 300 is connected to at least one of the GLDB 100, the SC 200, or another CRS 300.

The GLDB 100 is an entity that provides available frequency information to a communication node included in the CRS 300. The available frequency information includes information indicating at least one available frequency (i.e., an available normal-band channel), information indicating maximum allowable transmission power associated with the available frequency, information indicating a spectrum mask of the available frequency, and the like. The available frequency information realizes protection of the primary system. The available frequency information provided by the GLDB 100 is the available frequency information regarding the normal-band channel, and hereinafter may also be referred to as first available frequency information.

The SC 200 is an entity that coordinates frequency usage by the CRS 300 on the basis of information provided from the GLDB 100 and the frequency usage information provided from the CRS 300. The SC 200 may communicate with another SC 200 for coordination of the frequency usage.

The CRS 300 is an entity that represents a communication node or a network including a plurality of communication nodes. Examples of the network including a plurality of communication nodes include, for example, a network including a master WSD and a plurality of slave WSDs, a radio access network (RAN), and the like. The CRS 300 acquires the first available frequency information from the GLDB 100 directly or indirectly via the SC 200, and performs secondary usage of the frequency on the basis of the first available frequency information. Furthermore, the CRS 300 provides the SC 200 with frequency usage information, which is information regarding the frequency to be secondarily used. Note that, among the CRSs 300, a CRS 300 connected to the GLDB 100 or the SC 200 and connected to another CRS 300 may also be referred to as a master CRS, and a CRS 300 connected to the master CRS without being connected to any of the above may also be referred to as a slave CRS. In the example shown in FIG. 2, a CRS 300B is the master CRS, and a CRS 300C is a slave CRS.

Contact points between entities are also referred to as reference points. Specifically, a contact point between the GLDB 100 and the CRS 300 is also referred to as a reference point A. A contact point between the SC 200 and the CRS 300 is also referred to as a reference point B. A nodal point between the SCs 200 is also referred to as a reference point C. A contact point between the GLDB 100 and the SC 200 is also referred to as a reference point D. A nodal point of the CRSs 300 is also referred to as a reference point E.

<2.2. Physical Configuration Example>

(1) Overall Configuration Example

Figure 3:
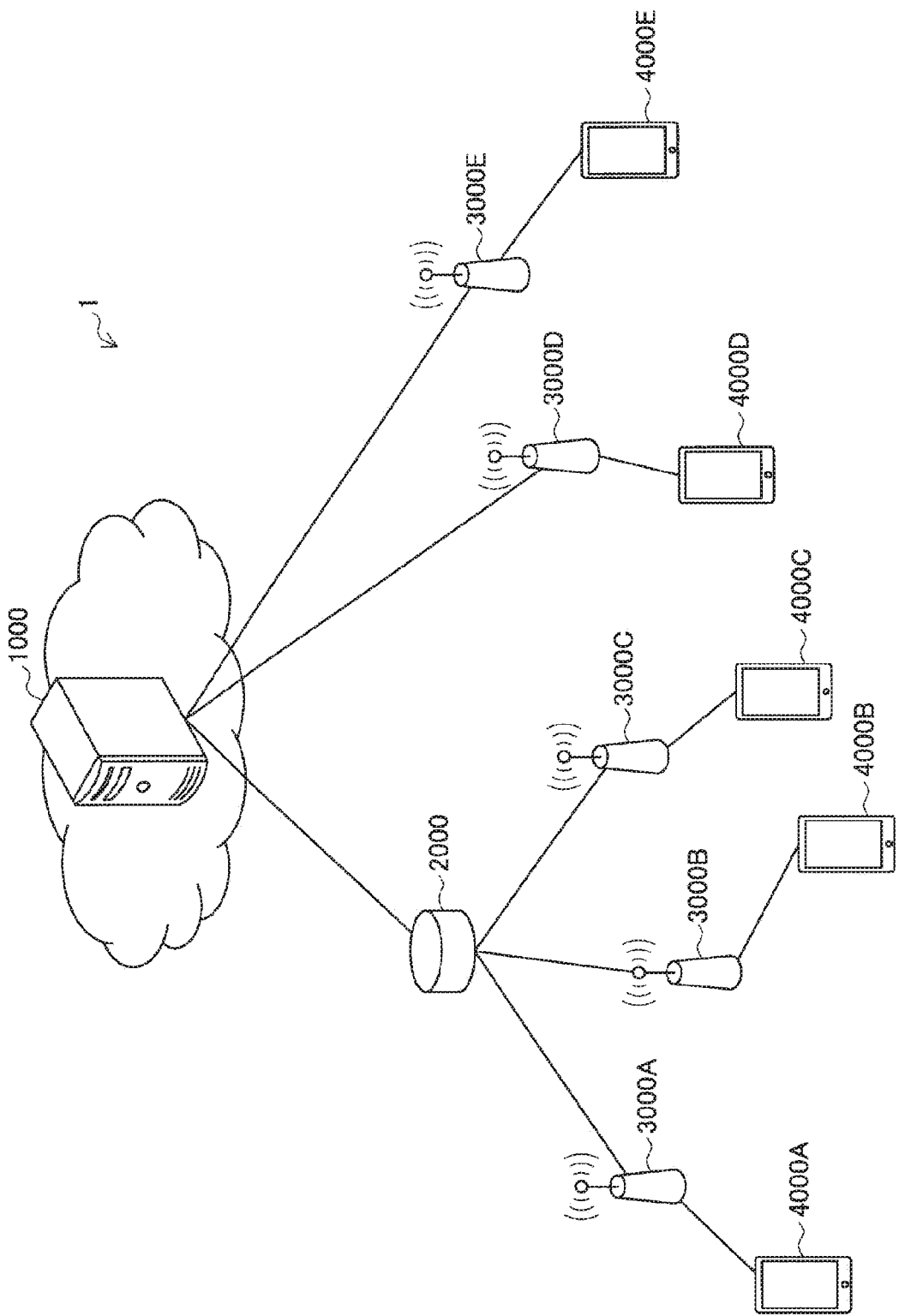
FIG. 3 is a diagram for explaining an example of a physical configuration of the system according to the present embodiment.

FIG. 3 is a diagram for explaining an example of a physical configuration of the system 1 according to the present embodiment. As shown in FIG. 3, the system 1 according to the present embodiment includes a frequency supervising database 1000, a network manager 2000, a plurality of base stations 3000 (3000A to 3000E), and a plurality of terminal devices 4000 (4000A to 4000E).

The frequency supervising database 1000 is a control device that supervises frequency secondary usage. The frequency supervising database 1000 corresponds to the GLDB 100 described above. The network manager 2000 is a control device that manages a network under management. The base station 3000 is a communication device that provides the terminal device 4000 with a wireless communication service and communicates with the terminal device 4000. The terminal device 4000 is a communication device that receives the wireless communication service from the base station 3000 and communicates with the base station 3000. The base station 3000 and the terminal device 4000 correspond to the CRS 300 described above. In addition, the base station 3000 corresponds to the master CRS 300, and the terminal device 4000 corresponds to the slave CRS 300.

Basically, the base station 3000 (3000A to 3000C) operates on the basis of control by the network manager 2000. In this case, the base station 3000 accesses the frequency supervising database 1000 via the network manager 2000, or the network manager 2000 accesses the frequency supervising database 1000 on behalf of the base station 3000. The network manager 2000 corresponds to the SC 200 described above. Note that the network manager 2000 may also be regarded as corresponding to the CRS 300.

Exceptionally, the base station 3000 (3000D and 3000E) directly accesses the frequency supervising database 1000 in a case of operating without control by the network manager 2000.

(2) Configuration Example of Network Manager 2000

Figure 4:
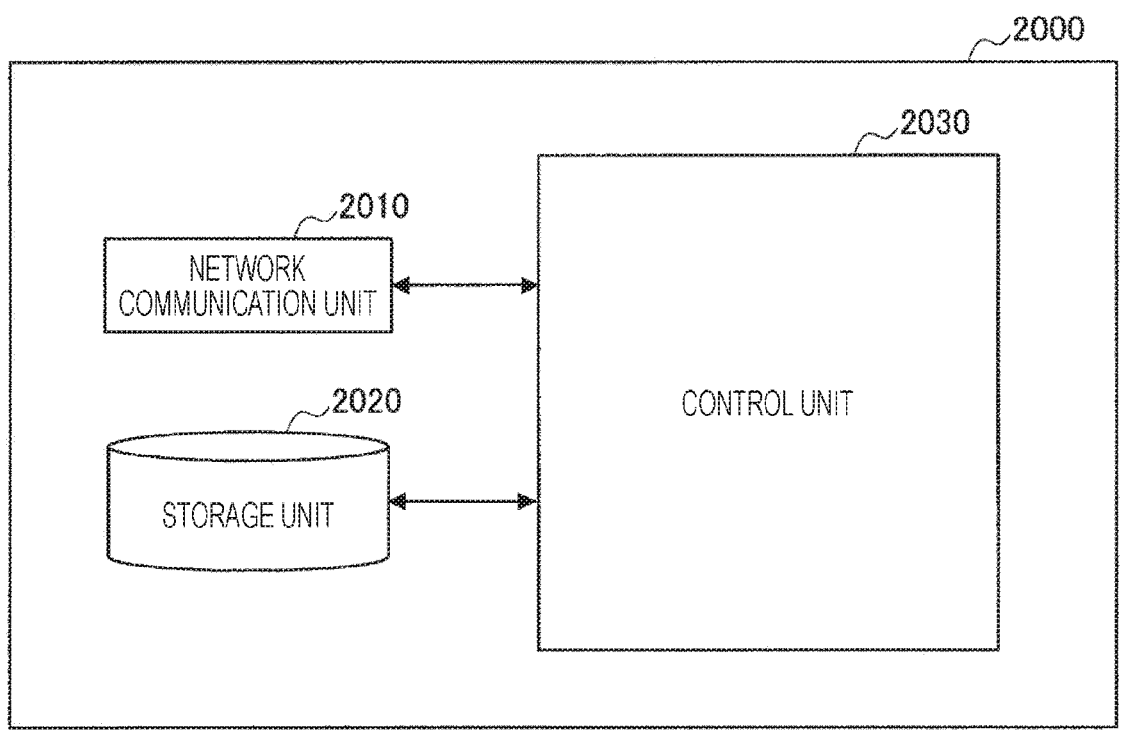
FIG. 4 is a block diagram showing an example of a configuration of a network manager according to the present embodiment.

FIG. 4 is a block diagram showing an example of a configuration of the network manager 2000 according to the present embodiment. As shown in FIG. 4, the network manager 2000 includes a network communication unit 2010, a storage unit 2020, and a control unit 2030.

The network communication unit 2010 transmits and receives information. For example, the network communication unit 2010 transmits information to another node and receives information from another node. For example, the another node includes the frequency supervising database 1000, another network manager 2000, and the base station 3000.

The storage unit 2020 temporarily or permanently stores a program and various data for various operations of the network manager 2000.

The control unit 2030 provides various functions of the network manager 2000. The control unit 2030 has a function as the SC 200, and performs subchannelization, calculation of available frequency information based on the subchannelization, and provision to the base station 3000. Note that the control unit 2030 may include a function as the GLDB 100. In this case, the control unit 2030 calculates and provides first available frequency information. The network manager 2000 having the function as the GLDB 100 may be realized by including the network manager 2000 (i.e., the SC 200) in the frequency supervising database 100.

(3) Configuration Example of Base Station 3000

Figure 5:
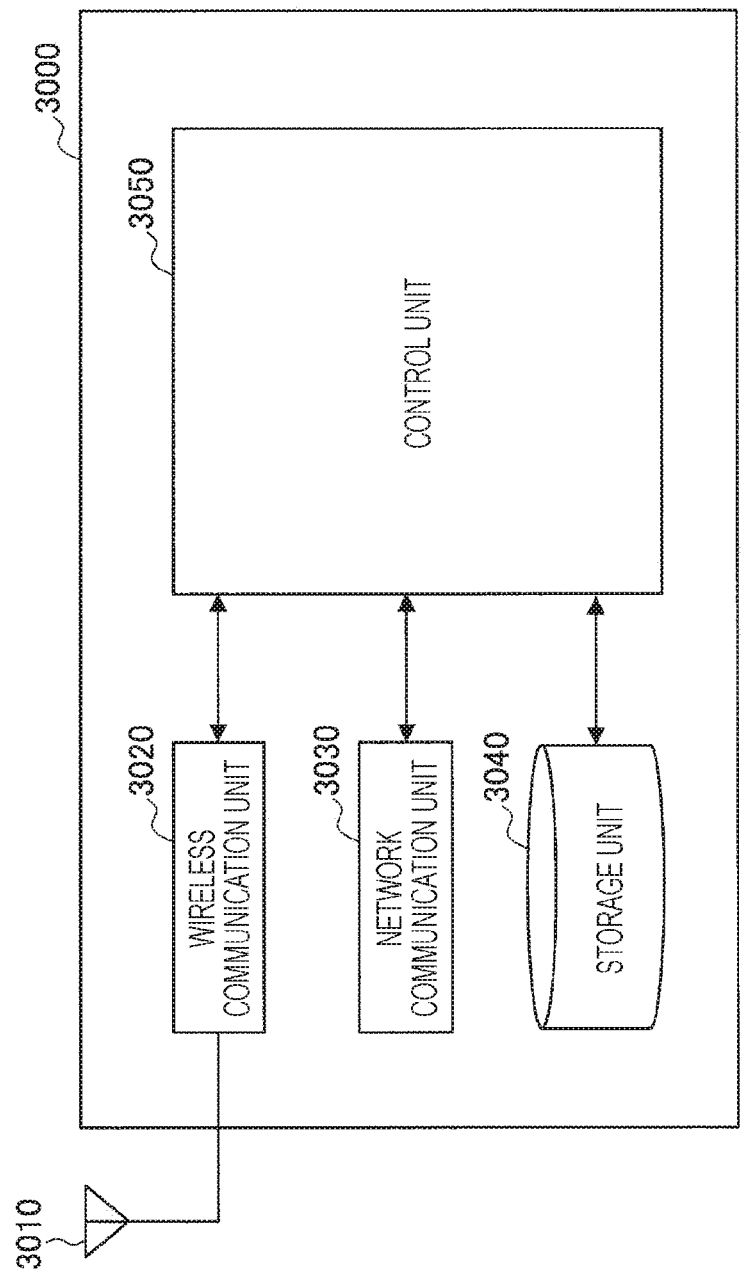
FIG. 5 is a block diagram showing an example of a configuration of a base station according to the present embodiment.

FIG. 5 is a block diagram showing an example of a configuration of the base station 3000 according to the present embodiment. Referring to FIG. 5, the base station 3000 includes an antenna unit 3010, a wireless communication unit 3020, a network communication unit 3030, a storage unit 3040, and a control unit 3050.

The antenna unit 3010 emits a signal outputted by the wireless communication unit 3020 into space as a radio wave. Furthermore, the antenna unit 3010 converts a radio wave in space into a signal, and outputs the signal to the wireless communication unit 3020.

The wireless communication unit 3020 transmits and receives a signal. For example, the wireless communication unit 3020 transmits a downlink signal to a terminal device and receives an uplink signal from a terminal device.

The network communication unit 3030 transmits and receives information. For example, the network communication unit 3030 transmits information to another node and receives information from another node. For example, the another node includes another base station 3000, the network manager 2000, and the frequency supervising database 1000.

The storage unit 3040 temporarily or permanently stores a program and various data for various operations of the base station 3000.

The control unit 3050 provides various functions of the base station 3000. The control unit 3050 has a function as the master CRS 300, and performs acquisition of available frequency information based on subchannelization, and provision of a wireless service based on the available frequency information. The control unit 3050 may have a function as the SC 200. In this case, the control unit 3050 performs subchannelization and calculation of available frequency information based on the subchannelization.

(4) Configuration Example of the Terminal Device 4000

Figure 6:
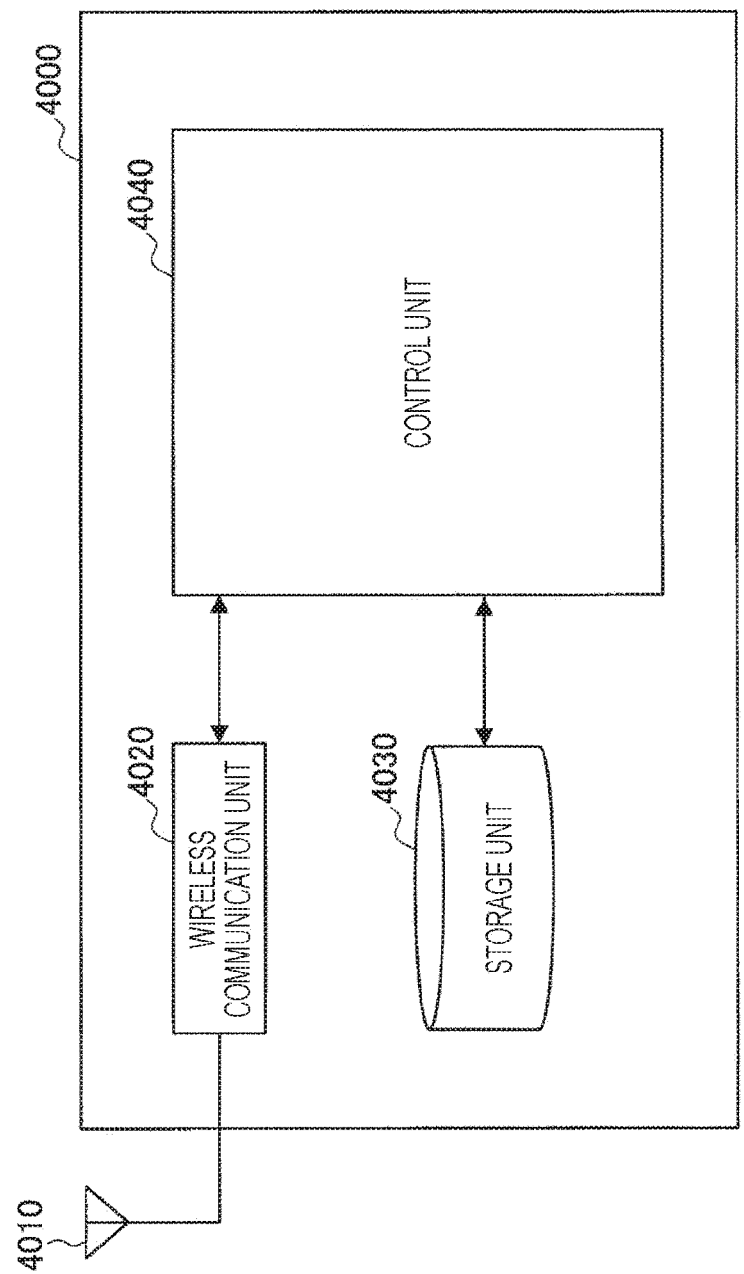
FIG. 6 is a block diagram showing an example of a configuration of a terminal device according to the present embodiment.

FIG. 6 is a block diagram showing an example of a configuration of the terminal device 4000 according to the present embodiment. Referring to FIG. 6, the terminal device 4000 includes an antenna unit 4010, a wireless communication unit 4020, a storage unit 4030, and a control unit 4040.

The antenna unit 4010 emits a signal outputted by the wireless communication unit 4020 into space as a radio wave. Furthermore, the antenna unit 4010 converts a radio wave in space into a signal, and outputs the signal to the wireless communication unit 4020.

The wireless communication unit 4020 transmits and receives a signal. For example, the wireless communication unit 4020 receives a downlink signal from a base station and transmits an uplink signal to the base station.

The storage unit 4030 temporarily or permanently stores a program and various data for various operations of the terminal device 4000.

The control unit 4040 provides various functions of the terminal device 4000. The control unit 4040 has a function as the slave CRS 300, performs measurement, and notifies the base station 3000 of information indicating a measurement result (i.e., a measurement report).

<2.3. Logical Functional Configuration>

A logical functional configuration implemented in each device of the system 1 according to the present embodiment will be described below with reference to FIGS. 7 to 12.

(1) Logical Functional Configuration

Figure 7:
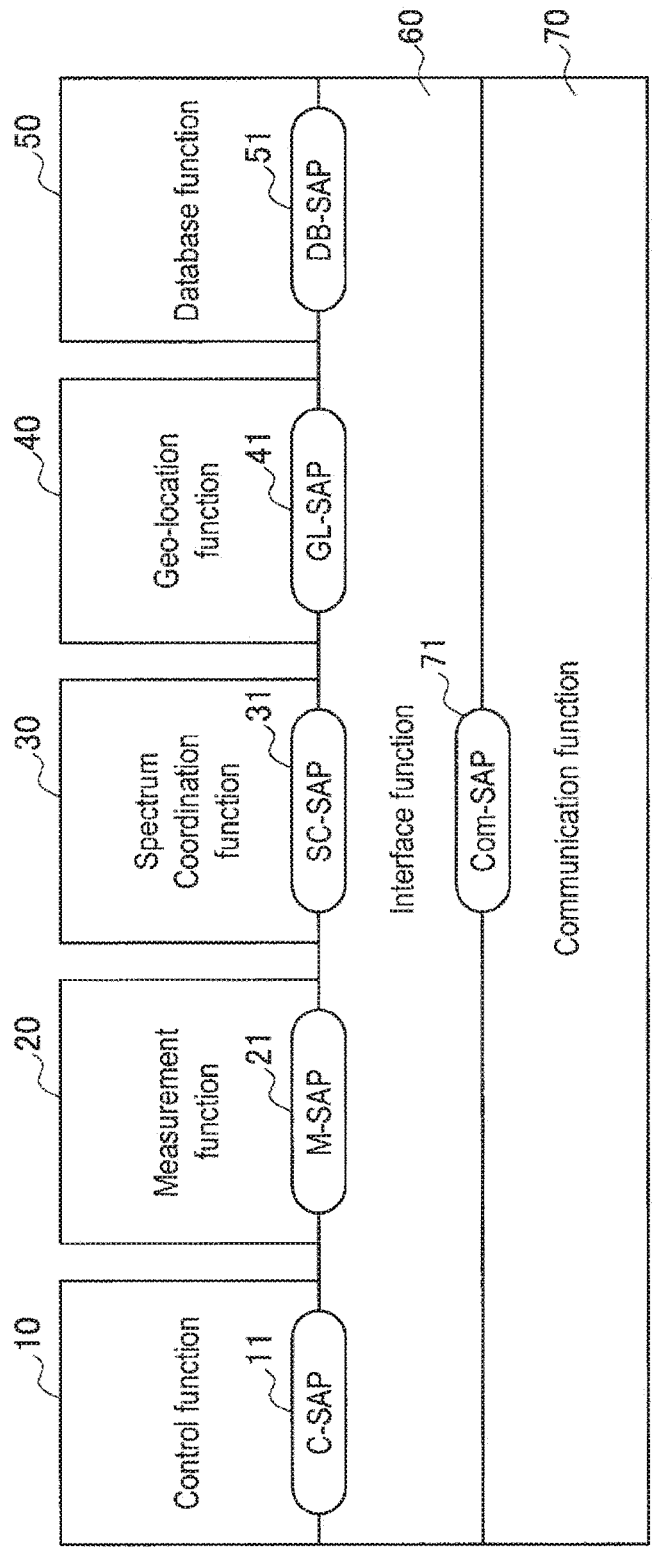
FIG. 7 is a view for explaining an example of a logical functional configuration of the system according to the present embodiment.

FIG. 7 is a view for explaining an example of a logical functional configuration of the system 1 according to the present embodiment. As shown in FIG. 7, the system 1 includes seven logical functional entities and five service access points (SAPs). The seven logical functional entities include: a control function 10, a measurement function 20, a spectrum coordination function 30, a geo-location function 40, a database function 50, an interface function 60, and a communication function 70. The five service access points include a control (C)-SAP 11, a measurement (M)-SAP 21, a spectrum coordination (SC)-SAP 31, a geo-location (GL)-SAP 41, a database (DB)-SAP 51, and a communication (Com)-SAP 71.

The database function 50 is a software or hardware module having a function of storing registration information and operational parameter information of a communication node, and information for calculating first available frequency information of a communication node. A service access point of the database function 50 is the DB-SAP 51. The DB-SAP 51 is used by the interface function 60 to access services provided by the database function 50, such as registration of a communication node and provision of information of a primary system.

The geo-location function 40 is a software or hardware module having a function of calculating first available frequency information of a communication node according to a geo-location of a communication node on the basis of the laws. A service access point of the geo-location function 40 is the GL-SAP 41. The GL-SAP 41 is used by the interface function 60 to access a service provided by the geo-location function 40, such as calculation of first available frequency information.

The spectrum coordination function 30 is a software or hardware module having a function of performing subchannelization and calculation of available frequency information based on the subchannelization. The spectrum coordination function 30 also has a function of interacting with the measurement function 20, the geo-location function 40, the database function 50, or the like, for acquisition of information to be used for subchannelization and calculation of available frequency information based on the subchannelization. The available frequency information based on sub-channelization is hereinafter also referred as second available frequency information. Note that, in a case where it is not necessary to particularly distinguish the first available frequency information and the second available frequency information, they are also collectively referred to as available frequency information. A service access point of the spectrum coordination function 30 is the SC-SAP 31. The SC-SAP 31 is used by the interface function 60 to access a service provided by the spectrum coordination function 30, such as subchannelization of a frequency band.

The measurement function 20 is a software or hardware module having a function of performing measurement (i.e., measuring). A service access point of the measurement function 20 is the M-SAP 21. The M-SAP 21 is used by the interface function 60 to access a service provided by the measurement function 20, such as acquisition of a measurement report (i.e., information indicating a measurement result).

The control function 10 is a software or hardware module having a function of providing or receiving a narrow-band channel wireless service on the basis of coordination by the spectrum coordination function 30. A service access point of the control function 10 is the C-SAP 11. The C-SAP 11 is used by the interface function 60 to access a service provided by the control function 10, such as providing or receiving a wireless service.

The communication function 70 is a software or hardware module to provide a communication protocol stack requested by an interface between logical functional entities, and other communication services. A service access point of the communication function 70 is the Com-SAP 71. The Com-SAP 71 exchanges available frequency information, information indicating a measurement result, auxiliary information, and other related information between the communication function 70 and the interface function 60. Furthermore, the Com-SAP 71 has a role of abstracting a communication mechanism in order to use the communication function 70 between reference points, by definition of a set of generic primitives and mapping of these primitives to a transfer protocol. Therefore, a communication mechanism applied in implementation may be, for example, for a PHY/MAC layer: a global system for mobile communications (GSM, registered trademark), a universal mobile telecommunications system (UMTS), long term evolution (LTE), new radio (NR) being studied for 5G, or later cellular system technologies; a wireless local area network (LAN) standard (IEEE 802.11a, b, n, g, ac, ad, af, ah) established by the IEEE 802.11 working group (WG) or standards (IEEE 802.11ax, ay, and the like) expected to be established in the future; or an IEEE 802.16 WG or IEEE 802.15 WG standard. As higher-level layer communication means, for example, communication may be performed on the basis of the hypertext transfer protocol (HTTP) protocol.

The interface function 60 is an abstraction of integrity between functional blocks to realize a reference point. For the interface function 60, all the SAPs described above are to be a service access point.

The logical functional configuration of the system 1 has been described above. Subsequently, a configuration example of each reference point will be described with reference to FIGS. 8 to 12.

(2) Configuration Example of Reference Point A

Figure 8:
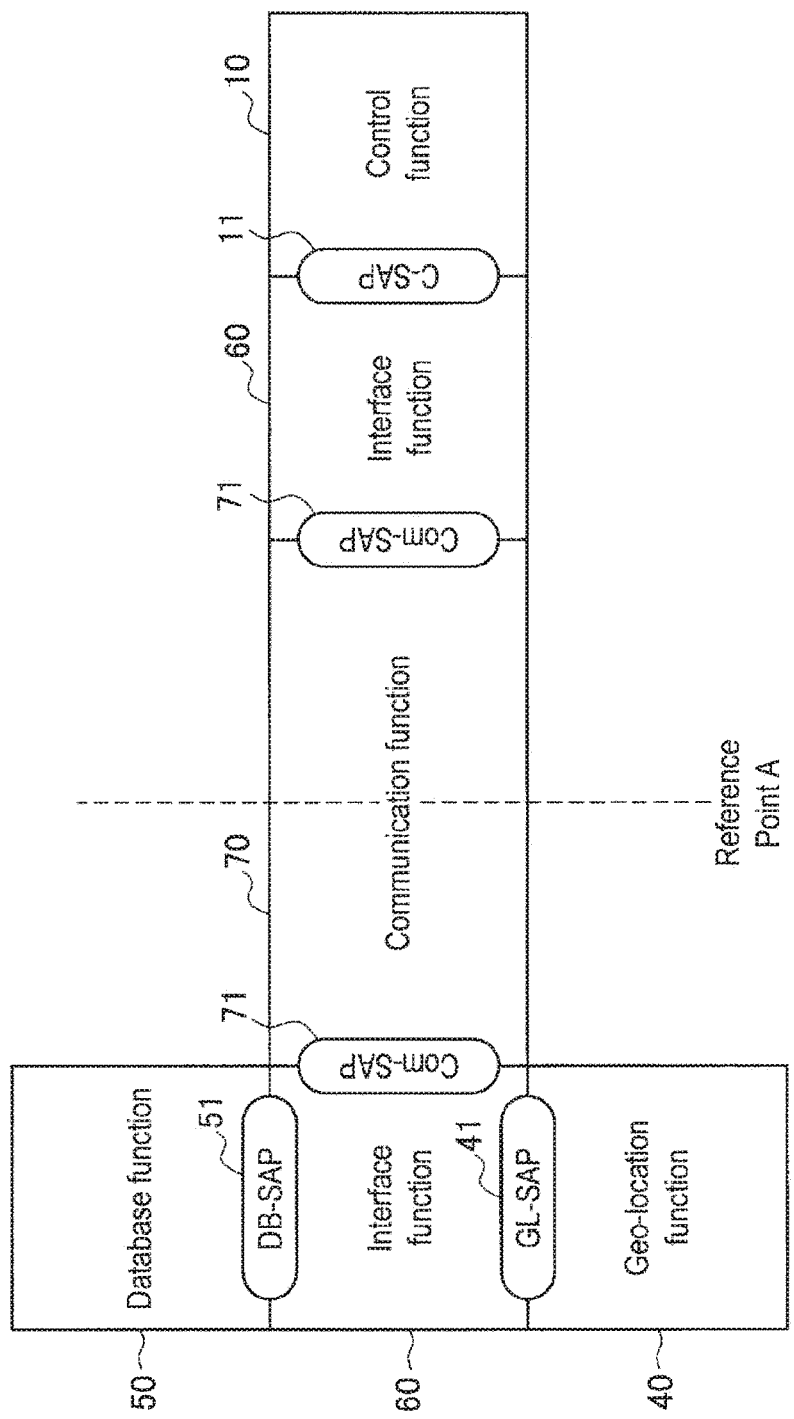
FIG. 8 is a view showing an example of a configuration of a reference point A of the system according to the present embodiment.

FIG. 8 is a view showing an example of a configuration of a reference point A of the system 1 according to the present embodiment. As shown in FIG. 8, the communication function 70 is mapped to the reference point A. Then, the communication function 70, the database function 50, the interface function 60, and the geo-location function 40 on the left side with the reference point A interposed are mapped to the GLDB 100. Furthermore, the communication function 70, the interface function 60, and the control function 10 on the right side with the reference point A interposed are mapped to the CRS 300.

Figure 9:
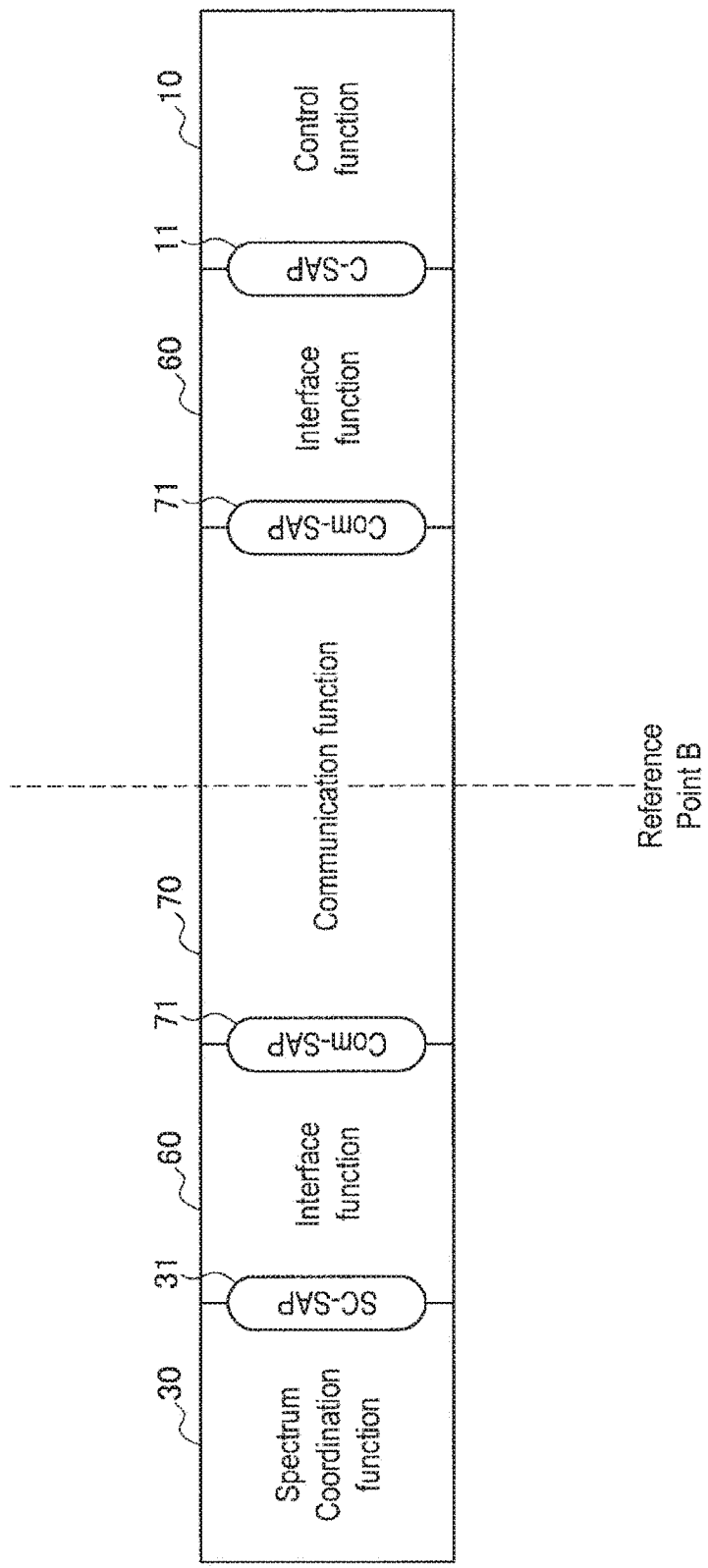
FIG. 9 is a view showing an example of a configuration of a reference point B of the system according to the present embodiment.

FIG. 9 is a view showing an example of a configuration of a reference point B of the system 1 according to the present embodiment. As shown in FIG. 9, the communication function 70 is mapped to the reference point B. Then, the communication function 70, the interface function 60, and the spectrum coordination function 30 on the left side with the reference point B interposed are mapped to the SC 200. Furthermore, the communication function 70, the interface function 60, and the control function 10 on the right side with the reference point B interposed are mapped to the CRS 300.

Figure 10:
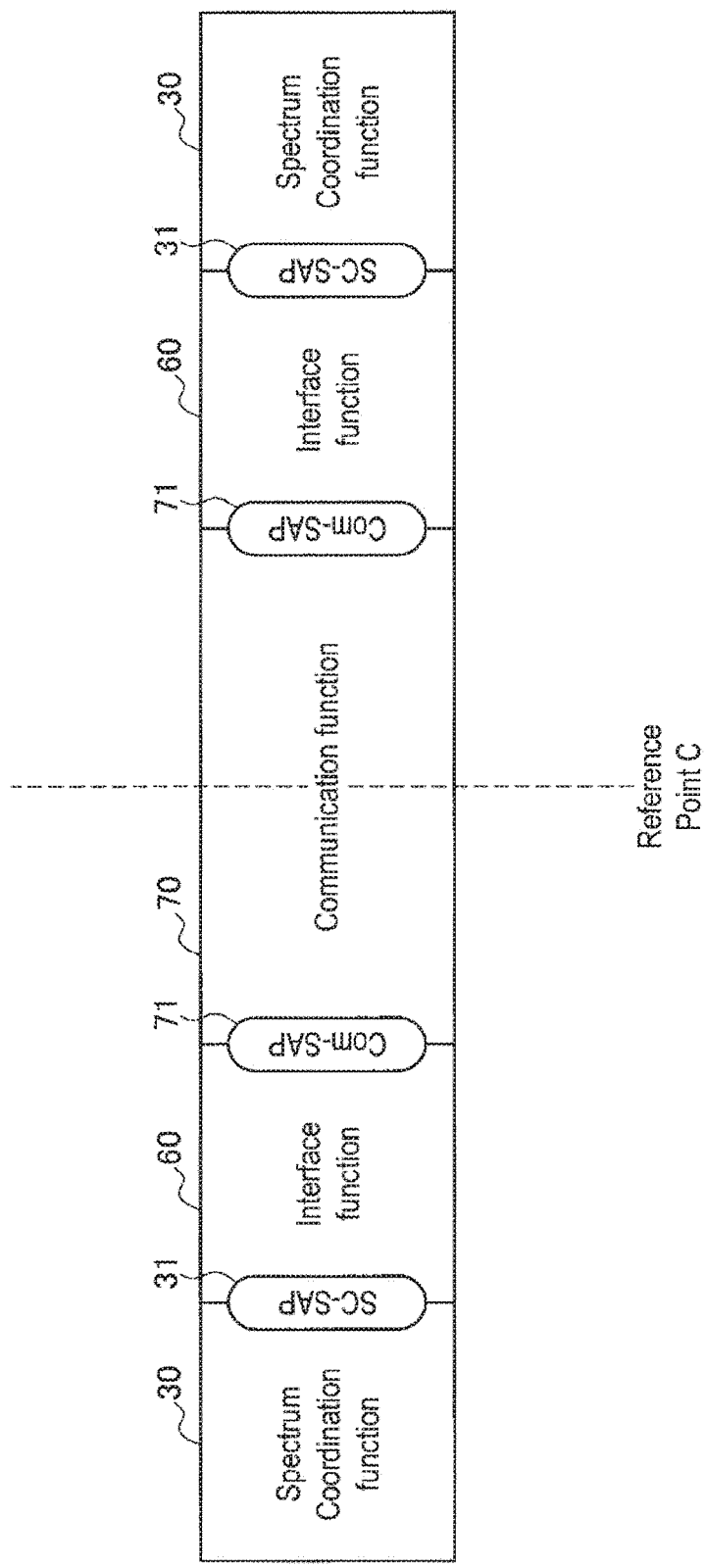
FIG. 10 is a view showing an example of a configuration of a reference point C of the system according to the present embodiment.

FIG. 10 is a view showing an example of a configuration of a reference point C of the system 1 according to the present embodiment. As shown in FIG. 10, the communication function 70 is mapped to the reference point C. Then, the communication function 70, the interface function 60, and the spectrum coordination function 30 on the left side with the reference point C interposed are mapped to the SC 200. Furthermore, the communication function 70, the interface function 60, and the spectrum coordination function 30 on the right side with the reference point C interposed are mapped to another SC 200.

Figure 11:
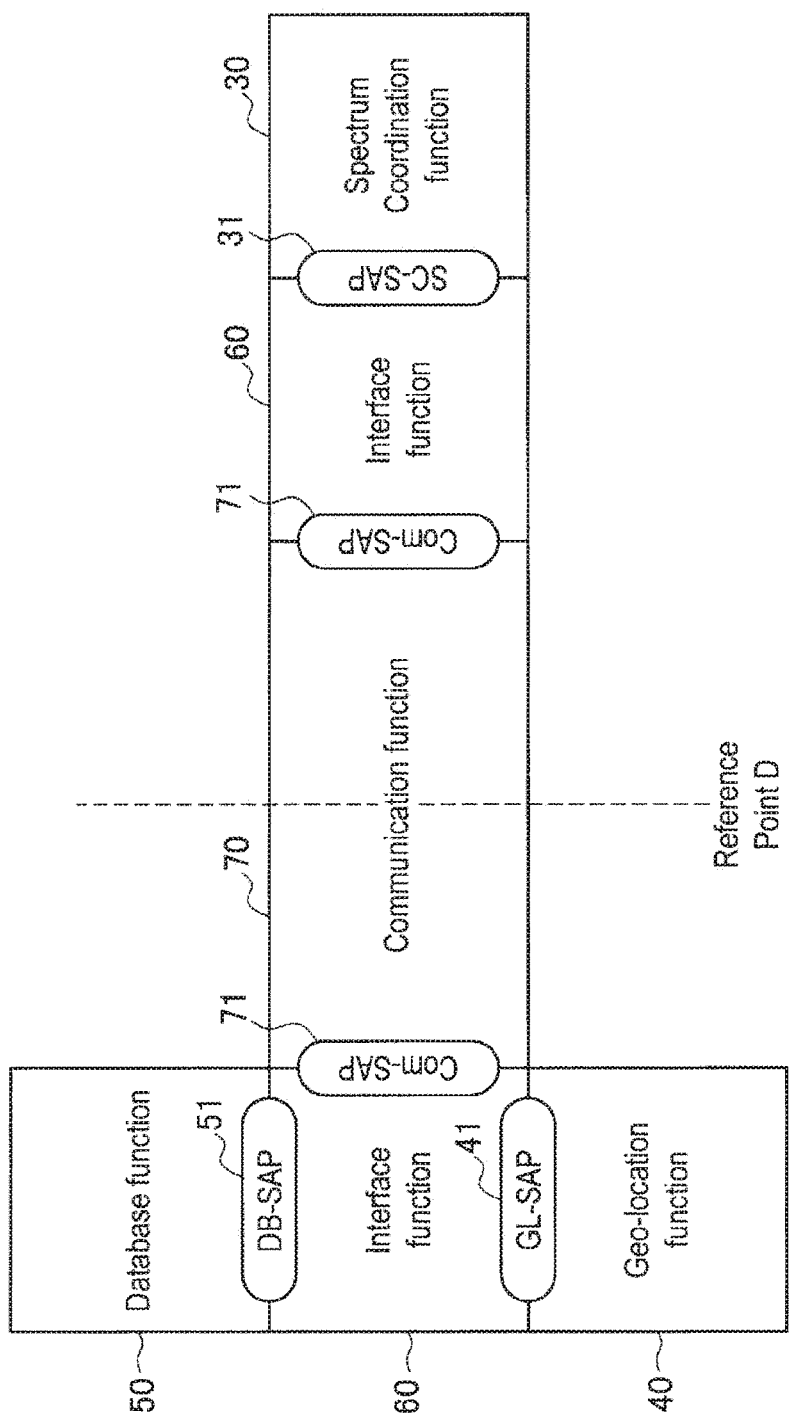
FIG. 11 is a view showing an example of a configuration of a reference point D of the system according to the present embodiment.

FIG. 11 is a view showing an example of a configuration of a reference point D of the system 1 according to the present embodiment. As shown in FIG. 11, the communication function 70 is mapped to the reference point D. Then, the communication function 70, the database function 50, the interface function 60, and the geo-location function 40 on the left side with the reference point D interposed are mapped to the GLDB 100. Furthermore, the communication function 70, the interface function 60, and the spectrum coordination function 30 on the right side with the reference point D interposed are mapped to the SC 200.

Figure 12:
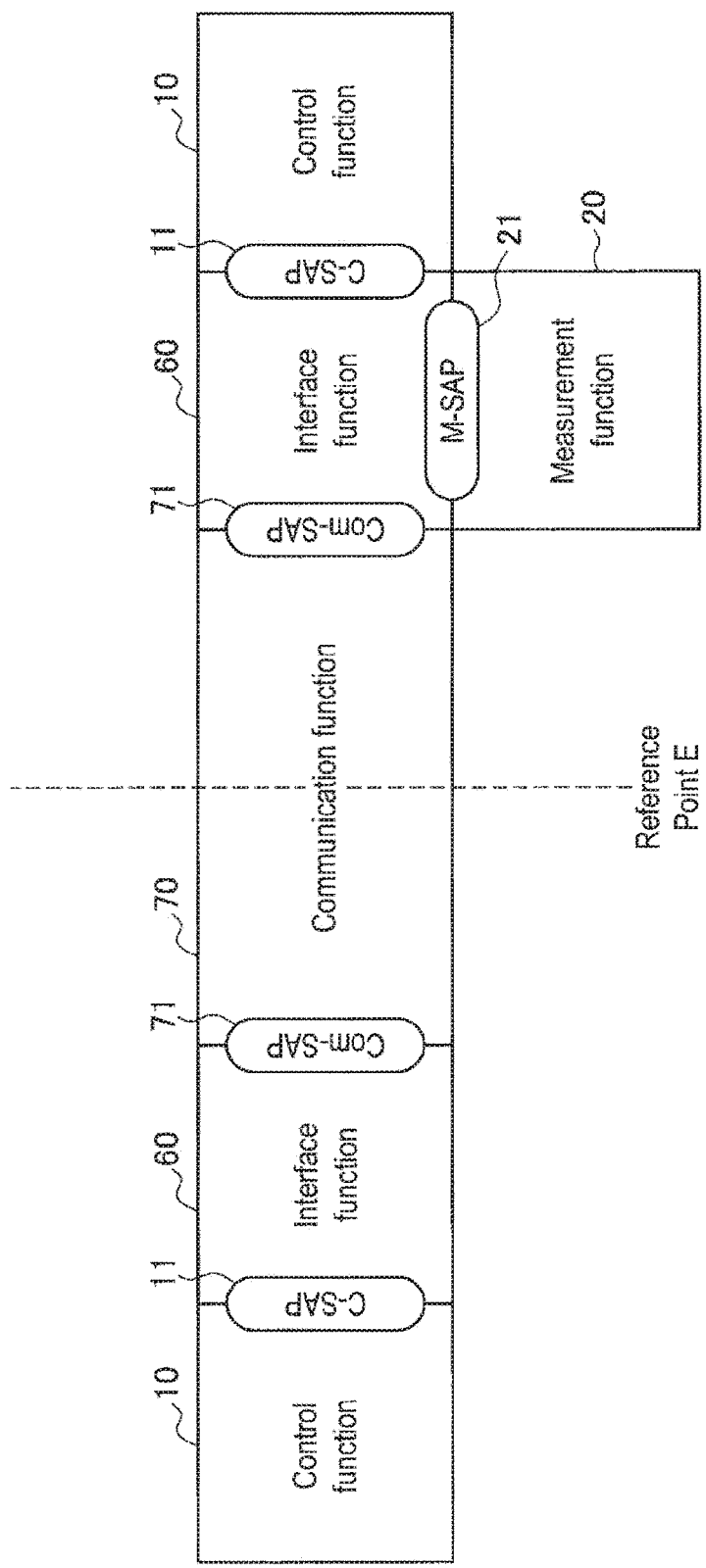
FIG. 12 is a view showing an example of a configuration of a reference point E of the system according to the present embodiment.

FIG. 12 is a view showing an example of a configuration of a reference point E of the system 1 according to the present embodiment. As shown in FIG. 12, the communication function 70 is mapped to the reference point E. Then, the communication function 70, the interface function 60, and the control function 10 on the left side with the reference point E interposed are mapped to the master CRS 300. Furthermore, the communication function 70, the interface function 60, the control function 10, and the measurement function 20 on the right side with the reference point D interposed are mapped to the slave CRS 300.

<<3. Technical Features>>

<3.1. Subchannelization>

(1) Overview

The SC 200 performs a division processing (i.e., subchannelization) of dividing a first frequency band indicated by the frequency supervising database 1000 (i.e., the GLDB 100) as a frequency band that can be used by at least one communication node (e.g., the base station 3000) included in the CRS 300, into a plurality of second frequency bands. The first frequency band corresponds to the normal-band channel described above, and is, for example, the 8 MHz wide channel in the TV frequency band in Europe or a 6 MHz wide channel in the TV frequency band in the US. The second frequency band corresponds to the narrow-band channel described above. The SC 200 divides, for example, the 8 MHz wide normal-band channel into a plurality of narrow-band channels.

Figure 13:
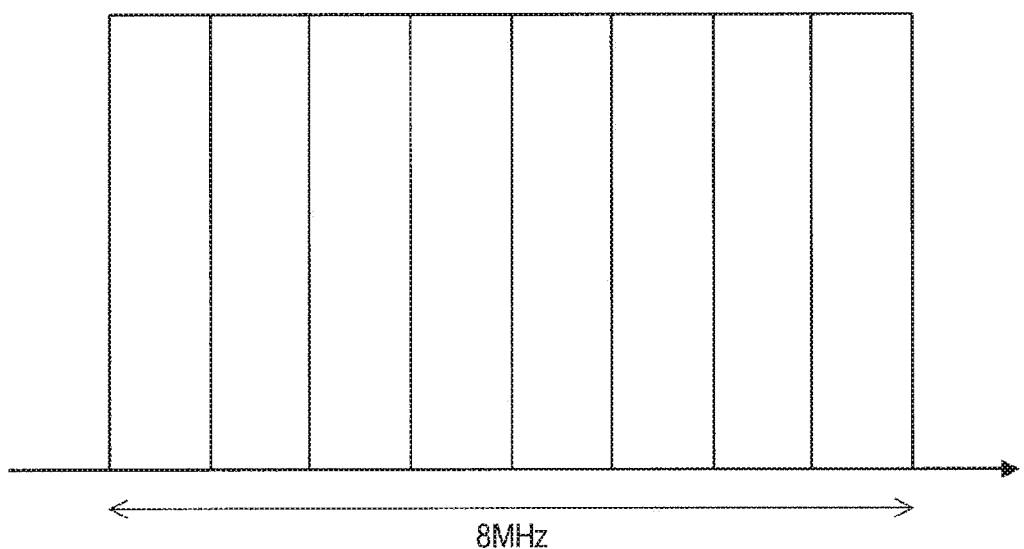
FIG. 13 is a view for explaining an example of subchannelization according to the present embodiment.

FIG. 13 is a view for explaining an example of subchannelization according to the present embodiment. In the example shown in FIG. 13, the 8 MHz wide normal-band channel is equally divided into eight 1 MHz wide narrow-band channels. A size (i.e., a bandwidth) and the number of channels of the narrow-band channel are not limited to this example and may be any size or number. Furthermore, the plurality of narrow-band channels obtained by dividing the normal-band channel may have a same size or the like (center frequency and channel spacing), or may be different from each other.

The SC 200 may determine the size of the narrow-band channel depending on a bandwidth of the primary system. For example, the SC 200 may determine, as the size of the narrow-band channel, a same bandwidth as a bandwidth of the primary system, a bandwidth of a multiple of the bandwidth of the primary system, or a bandwidth obtained by equally dividing the bandwidth of the primary system. Regarding usage of a wireless microphone by the PMSE, which is assumed as the primary system in the TV frequency band, the SC 200 sets the size of the narrow-band channel to 100 kHz, for example, since the bandwidth of the wireless microphone is 100 kHz. In this way, by determining the size according to the bandwidth of the primary system, it is possible to facilitate calculation for protection of the primary system.

(2) Second Available Frequency Information

The SC 200 generates (i.e., determines) second available frequency information by subchannelization.

The second available frequency information to be determined includes information indicating at least one available narrow-band channel. In other words, the SC 200 determines a plurality of narrow-band channels obtained by dividing an available normal-band channel. The information indicating a narrow-band channel includes at least one of: a bandwidth and a center frequency of each narrow-band channel; a lower limit frequency and an upper limit frequency for each narrow-band channel; or an interval between adjacent narrow-band channels (i.e., channel spacing).

Moreover, the SC 200 may determine which narrow-band channel should be used for each CRS 300 or for each communication node included in the CRS 300.

The second available frequency information to be determined may further include a spectrum mask for each narrow-band channel. In other words, the SC 200 may determine the spectrum mask of each narrow-band channel. For example, the SC 200 determines an adjacent channel leakage ratio (ACLR) for each narrow-band channel. This is because, in a case where a primary system that operates in a narrow band, such as a wireless microphone, is operating, a specific narrow-band channel may be adjacent to a channel used by the primary system and interfere with the primary system. The SC 200 may determine the ACLR according to the communication node. For example, in Non Patent Document 1, a relationship between a device class of a communication node and the ACLR is specified as shown in Table 1 below, and the SC 200 may determine a table similar to this.

[Table 1]

TABLE 1

One example of ACLR for each of different device classes in laws in Europe

| Where $P_{OOB}$ falls within the nth adjacent DTT channel (based on 8 MHz wide channels) | ACLR (dB) | | | | |
|---|---|---|---|---|---|
| | Class 1 | Class 2 | Class 3 | Class 4 | Class 5 |
| n = ±1 | 74 | 74 | 64 | 54 | 43 |
| n = ±2 | 79 | 74 | 74 | 64 | 53 |
| n ≥ +3 or n ≤ −3 | 84 | 74 | 84 | 74 | 64 |

The second available frequency information to be determined may include maximum allowable transmission power associated with the narrow-band channel. In other words, the SC 200 may determine maximum transmission power allowed in each narrow-band channel.

Note that, in the second available frequency information, information other than the information indicating the narrow-band channel, that is, the spectrum mask and the maximum allowable transmission power, may also be referred to as secondary usage information.

In a stage before subchannelization is fully adopted and operated, or in a case where there is no communication node that operates in a narrow band, there is no narrow-band channel. Therefore, it is difficult to perform subchannelization on the basis of the measurement report since measurement in a narrow-band channel has not been performed. Thus, in order to set a temporary narrow-band channel for performing measurement, the SC 200 may perform subchannelization by a default method. The default method refers to, for example, performing subchannelization with a predetermined number of channels or a predetermined bandwidth, and a predetermined channel spacing. The SC 200 may also adopt a default value for the maximum allowable transmission power or the spectrum mask.

The SC 200 may select a subchannelization pattern to be applied in accordance with a frequency usage status of the communication node, from a plurality of subchannelization patterns. The plurality of subchannelization patterns is mutually different in at least one of the number of divisions, the size, or the channel spacing. Such selection enables execution of subchannelization according to a constraint of hardware or software of the communication node.

(3) Information Used for Subchannelization

The SC 200 performs subchannelization on the basis of various kinds of information. For example, the SC 200 performs subchannelization by combining one or more pieces of information listed below.

The SC 200 performs subchannelization on the basis of first available frequency information at a position of the communication node included in the CRS 300. The first available frequency information includes information indicating an available normal-band channel, and the SC 200 recognizes a normal-band channel to be divided on the basis of this and performs subchannelization. Furthermore, the first available frequency information may include information indicating maximum allowable transmission power associated with the available normal-band channel, and the like, and the SC 200 may perform subchannelization on the basis of this. Information indicating a spectrum mask of an available frequency may be included, and the SC 200 may perform subchannelization on the basis of this. The first available frequency information is provided by the GLDB 100.

The SC 200 may perform subchannelization on the basis of capability information of the communication node (in particular, the terminal device 4000) included in the CRS 300. The capability information includes at least one of a device class of the communication node, or a communication mode supported by the communication node. The device class is, for example, capability of a transmission spectrum, and a plurality of device classes may be defined by the laws as shown in Table 1. Examples of the communication mode include, for example, a mode in which communication is performed using a wide band channel, a mode in which communication is performed using a narrow-band channel, and the like. The capability information is notified from the communication node to the SC 200 in a registration procedure. In particular, the communication node (e.g., the base station 3000) included in the master CRS 300 notifies the SC 200 of own capability information.

Furthermore, the communication node included in the master CRS 300 also notifies the SC 200 of the capability information of the communication node (e.g., the terminal device 4000) included in the slave CRS 300.

The SC 200 may perform subchannelization on the basis of registration information of the communication node included in the CRS 300. The registration information includes at least one of identification information or position information. The identification information includes, for example, at least one of a serial number, a model number, a manufacturer identifier, or legal certification information (FCC ID and the like) of a communication node. The position information includes, for example, at least one of latitude, longitude, or information indicating an area to belong to (e.g., a building name or an identifier indicating an address section). The registration information is notified from the communication node to the SC 200 in a registration procedure.

The SC 200 may perform subchannelization on the basis of information indicating a measurement result by the communication node included in the CRS 300. The information indicating a measurement result is a so-called measurement report. The measurement may be measurement based on a downlink reference signal from the base station 3000 to the terminal device 4000, measurement based on an uplink reference signal from the terminal device 4000 to the base station 3000, or measurement based on a sidelink reference signal between the terminal devices 4000. The measurement is performed on at least one of a plurality of narrow-band channels. The information indicating a measurement result includes, for example, at least one of reference signal received power (RSRP), a received signal strength indicator (RSSI), reference signal received quality (RSRQ), or an interference power per narrow-band channel. The information indicating a measurement result is notified from the communication node to the SC 200. In particular, the communication node (e.g., the terminal device 4000) included in the slave CRS 300B performs measurement processing (i.e., measurement) on at least one of a plurality of narrow-band channels. Then, the communication node included in the slave CRS 300B reports a measurement report to the communication node (e.g., the base station 3000) included in the master CRS 300A.

The SC 200 may perform subchannelization on the basis of used-frequency information of the communication node included in the CRS 300. The used-frequency information includes at least either of operating frequency information indicating a frequency being used by the communication node for operation, or information indicating transmission power being used by the communication node. The operating frequency information may include a center frequency and a bandwidth, or a lower limit frequency and an upper limit frequency, and the like. The used-frequency information is notified from the communication node to the SC 200.

In a case of recalculating the second available frequency information, the SC 200 may perform subchannelization on the basis of the currently applied second available frequency information.

An example of information that can be used for subchannelization has been described above.

(4) Adaptive Execution of Subchannelization

After subchannelization is performed once, subchannelization may be adaptively executed in accordance with a frequency usage status of the communication node. In other words, the second available frequency information may be updated (i.e. recalculated) in accordance with the frequency usage status of the communication node. This configuration allows the SC 200 to keep subchannelization optimized at all times.

For example, in a case where a new measurement report has been acquired, the SC 200 performs subchannelization again. For example, subchannelization is performed again in response to movement of the communication node, a change in interference situation, or the like. This configuration makes it possible to improve the utilization efficiency of the frequency.

For example, in a case where information provided from the GLDB 100 has been updated, the SC 200 performs subchannelization again. Examples of the information provided from the GLDB 100 include, for example, first available frequency information or various operational parameters. For example, subchannelization is performed again in response to a change in a frequency usage status by the primary system. This configuration makes it possible to reliably perform protection of the primary system.

(5) Notification of Second Available Frequency Information

The SC 200 notifies a communication node of information indicating a result of subchannelization, that is, second available frequency information. The CRS 300 acquires second available frequency information from the SC 200. In particular, a communication node (e.g., the base station 3000) included in the master CRS 300 acquires the second available frequency information from the SC 200, and notifies a communication node (e.g., the terminal device 4000) included in the slave CRS 300. This configuration allows the communication node included in the CRS 300 to perform communication using a narrow-band channel.

<3.2. Flow of Processing>

Hereinafter, an example of a flow of processing in the system 1 according to the present embodiment will be described with reference to FIGS. 14 to 17. Here, as an example, secondary usage in a TV frequency band is assumed, and description will be made using the terms specified in Non Patent Document 1 above. Of course, the present technology is applicable in other frequency bands, and the terms in Non Patent Document 1 may be replaced with other similar terms.

(1) Basic Secondary Usage Processing

First, a flow of basic secondary usage processing will be described with reference to FIG. 14.

Figure 14:
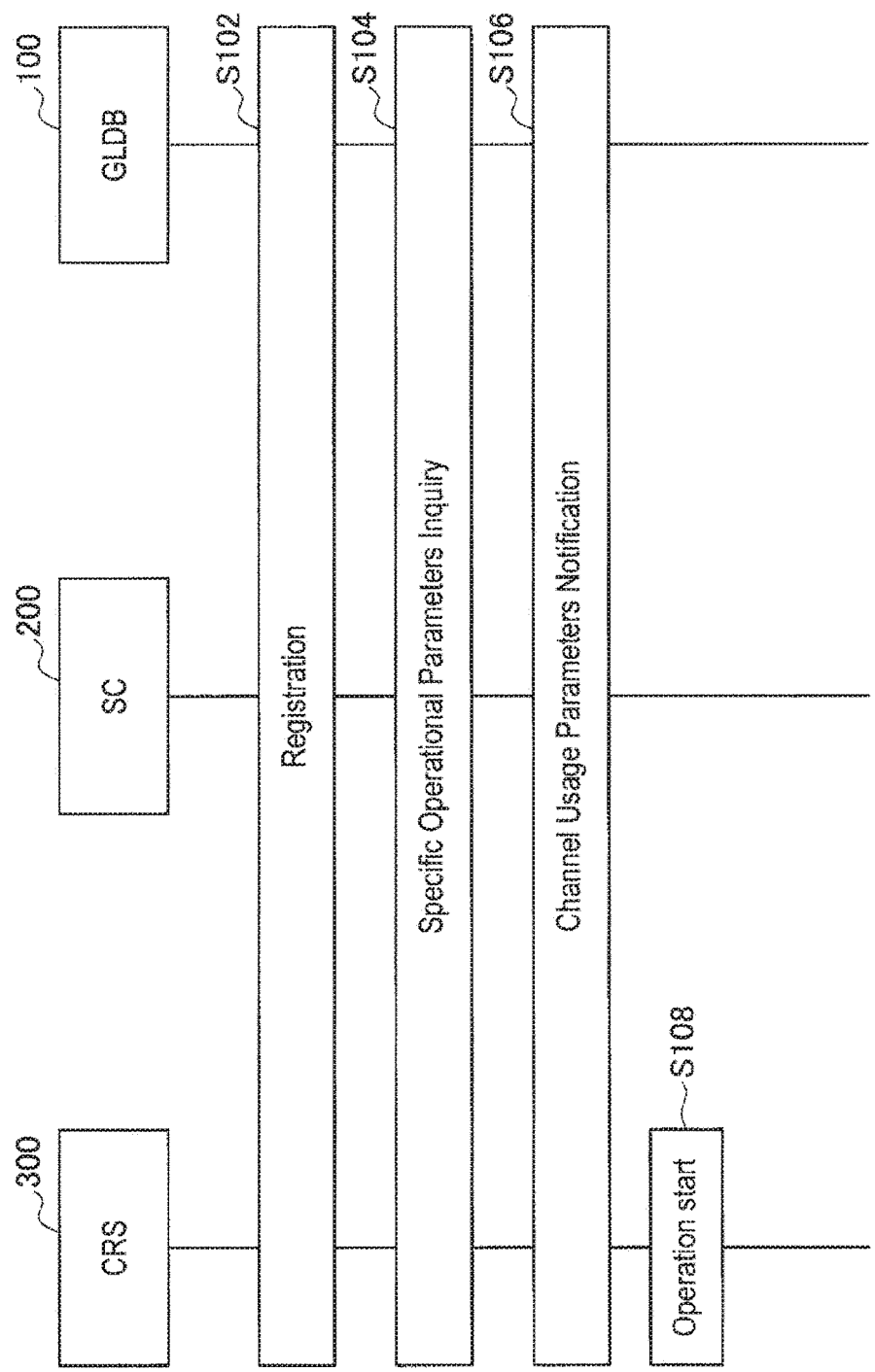
FIG. 14 is a sequence diagram showing an example of a flow of basic secondary usage processing executed in the system according to the present embodiment.

FIG. 14 is a sequence diagram showing an example of a flow of the basic secondary usage processing executed in the system 1 according to the present embodiment. This sequence involves the CRS 300 (more precisely, a communication node included in the CRS 300), the SC 200, and the GLDB 100.

As shown in FIG. 14, first, the GLDB 100, the SC 200, and the CRS 300 perform registration processing (step S102). Specifically, a communication node included in the CRS 300 transmits a registration request to the SC 200. The registration request includes, for example, information specified as a device parameter in Non Patent Document 1 above. Specifically, the registration request includes information (e.g., capability information) for specifying a technical feature of the communication node, and position information of the communication node. The SC 200 transfers the received registration request to the GLDB 100.

Next, the GLDB 100, the SC 200, and the CRS 300 perform a specific operational parameters inquiry processing (step S104). Specifically, after the registration processing is completed, the communication node included in the CRS 300 transmits a specific operational parameters inquiry request to the SC 200. The SC 200 transfers the received inquiry request to the GLDB 100. Upon acquiring a specific operational parameter from the GLDB 100, the SC 200 transfers the acquired specific operational parameter to the CRS 300. Note that the specific operational parameter is an operational parameter specific to each communication node, and corresponds to the first available frequency information described above.

Next, the GLDB 100, the SC 200, and the CRS 300 perform channel usage parameters notification processing (step S106). The communication node included in the CRS 300 determines a channel usage parameter on the basis of the acquired specific operational parameter. More specifically, the communication node included in the CRS 300 determines which normal-band channel to use among one or more available normal-band channels, and determines transmission power when using the normal-band channel. The channel usage parameter corresponds to the above-mentioned frequency usage information. The communication node included in the CRS 300 transmits the determined channel usage parameter to the SC 200. The SC 200 transfers the received channel usage parameter to the GLDB 100.

Then, the CRS 300 starts an operation (Step S108). Specifically, the communication node included in the CRS 300 starts an operation based on the channel usage parameter determined by itself, upon receiving an acknowledgment regarding the channel usage parameter from the GLDB 100.

(2) First Subchannelization Processing

Subsequently, an example of a flow of subchannelization processing will be described with reference to FIG. 15. The subchannelization processing is performed before or after the determination of the channel usage parameter in step S106. In other words, the subchannelization processing may be performed before the secondary usage of the normal-band channel is started and then the secondary use of narrow-band channels may start from the beginning, or the secondary usage of the normal-band channel may be once started and then switched to the narrow-band channel.

Figure 15:
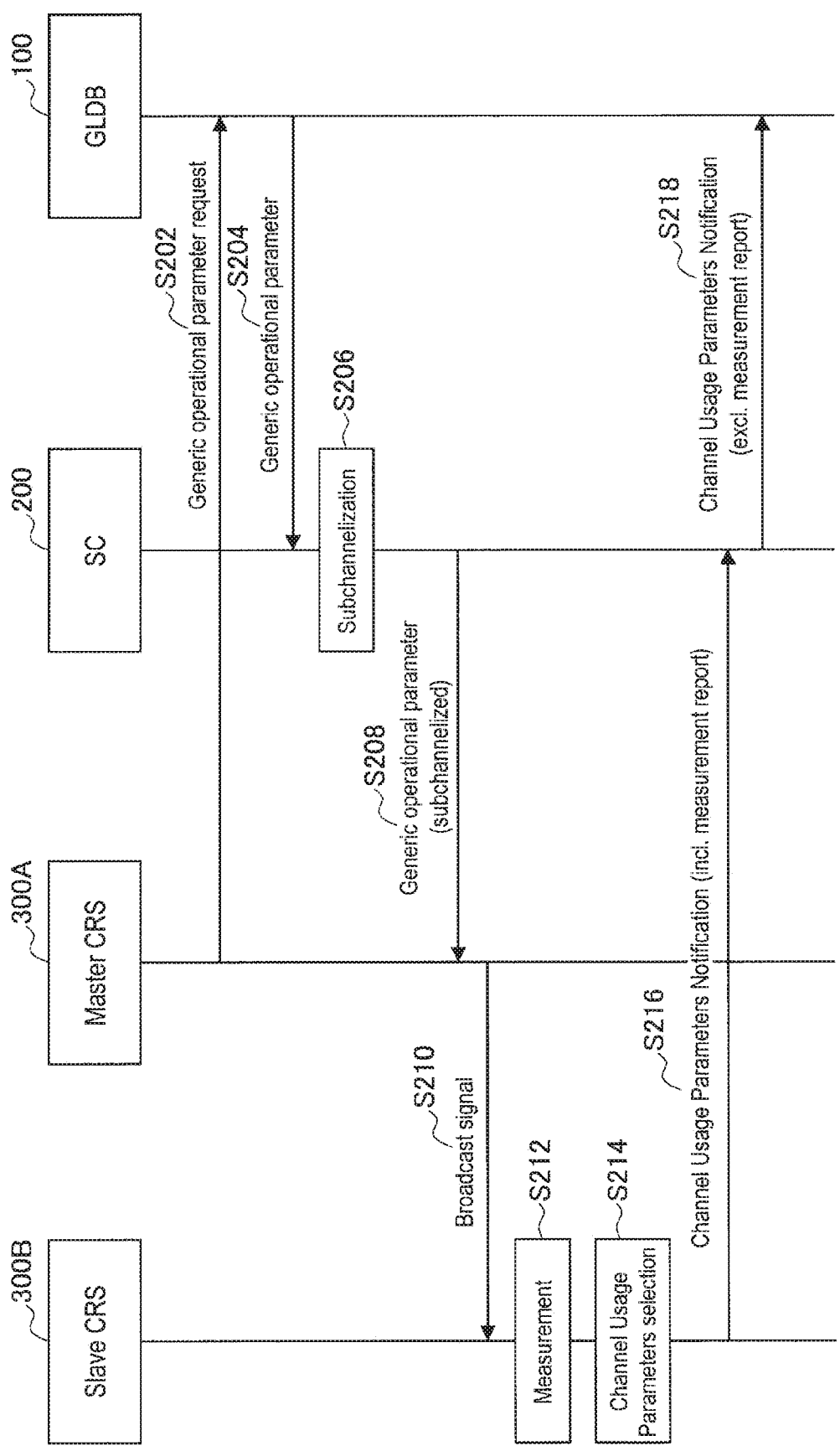
FIG. 15 is a sequence diagram showing an example of a flow of subchannelization processing executed in the system according to the present embodiment.

FIG. 15 is a sequence diagram showing an example of a flow of the subchannelization processing executed in the system 1 according to the present embodiment. This sequence involves the slave CRS 300B, the master CRS 300A, the SC 200, and the GLDB 100. Note that a communication node included in the master CRS 300A is, for example, the base station 3000. A communication node included in the slave CRS 300B is, for example, the terminal device 4000.

The communication node included in the master CRS 300A transmits a generic operational parameters request to the GLDB 100 via the SC 200, for providing a wireless service to the communication node included in the slave CRS 300B (step S202). Here, the generic operational parameter is information regarding frequencies that can be used irrespective of places within coverage of the communication node included in the master CRS 300A. The generic operational parameter is mainly utilized by terminals having mobility.

Next, the GLDB 100 transmits a generic operational parameter to the SC 200 (step S204).

Next, the SC 200 performs subchannelization (step S206). At this time, since the frequency usage status of the slave CRS 300B is unknown, the SC 200 performs subchannelization by the default method to generate second available frequency information. In other words, the SC 200 divides a normal-band channel into one or more narrow-band channels by the default method. The SC 200 may also determine maximum allowable transmission power or a spectrum mask. Note that subchannelization based on the default method may be performed in a case where a channel usage parameter has been notified from the CRS 300 to the SC 200. In that case, the SC 200 provides the CRS 300 with the second available frequency information as a response to the channel usage parameter notification.

Then, the SC 200 transmits a subchannelization result (i.e., second available frequency information) to the communication node included in the master CRS 300A together with the generic operational parameter (S208).

The communication node included in the CRS 300A broadcasts a notification signal (step S210). The notification signal includes the generic operational parameter and the second available frequency information received from the SC 200. Furthermore, the notification signal includes measurement configuration information for measurement.

Upon acquiring the notification signal, the communication node included in the slave CRS 300B performs measurement on the basis of the second available frequency information and the measurement configuration information (step S212). For example, the communication node included in the slave CRS 300B measures interference power in each narrow-band channel.

Next, the communication node included in the slave CRS 300B selects a channel usage parameter on the basis of the measurement result (step S214). In particular, the communication node included in the slave CRS 300B selects one or more narrow-band band channels to be used, from among one or more available narrow-band channels.

Next, the communication node included in the slave CRS 300B transmits a channel usage parameter notification to the communication node included in the master CRS 300A in the selected narrow-band channel, and the master CRS 300A transfers the channel usage parameter notification to the SC 200 (step S216). The channel usage parameter notification includes a measurement report.

Next, the SC 200 excludes the measurement report from the received channel usage parameter notification and transfers the channel usage parameter to the GLDB 100 (step S218). The SC 200 may also transfer the measurement report to the GLDB 100.

(3) Second and Subsequent Subchannelization Processing

Subsequently, an example of a flow of processing in a case of executing subchannelization again will be described.

In a case where a measurement report has been newly acquired

Figure 16:
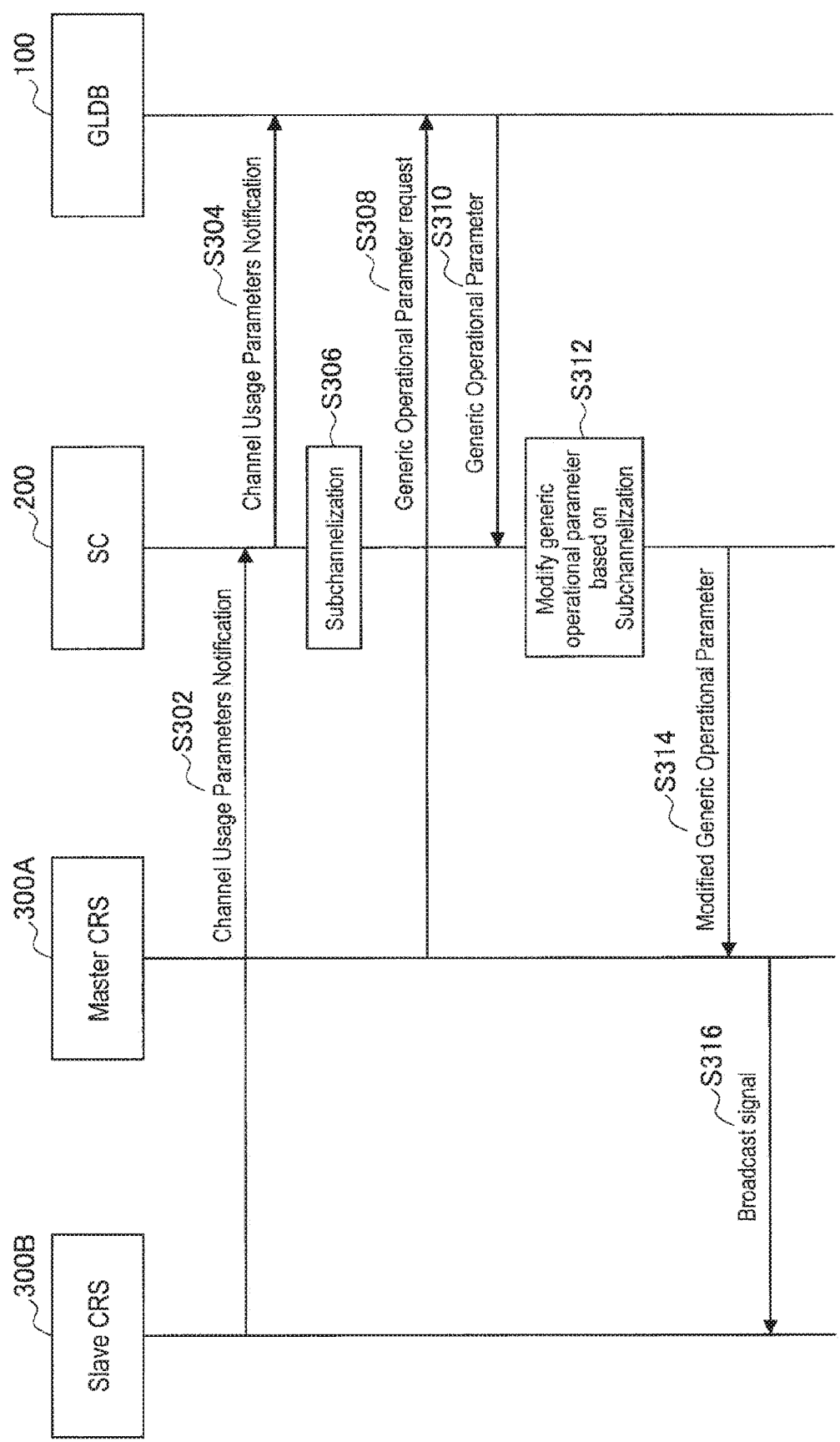
FIG. 16 is a sequence diagram showing an example of a flow of the subchannelization processing executed in the system according to the present embodiment.

FIG. 16 is a sequence diagram showing an example of a flow of the subchannelization processing executed in the system 1 according to the present embodiment. This sequence involves the slave CRS 300B, the master CRS 300A, the SC 200, and the GLDB 100. Note that a communication node included in the master CRS 300A is, for example, the base station 3000. A communication node included in the slave CRS 300B is, for example, the terminal device 4000.

As shown in FIG. 16, first, the communication node included in the slave CRS 300B transmits a channel usage parameter notification to the communication node included in the master CRS 300A, and the master CRS 300A transfers the channel usage parameter notification to the SC 200 (step S302). The channel usage parameter notification includes a measurement report.

Next, the SC 200 excludes the measurement report from the received channel usage parameter notification and transfers the channel usage parameter to the GLDB 100 (step S304). The SC 200 may also transfer the measurement report to the GLDB 100.

Next, the SC 200 performs subchannelization on the basis of the measurement report included in the received channel usage parameter notification (step S306).

Next, the communication node included in the master CRS 300A transmits a generic operational parameters request to the GLDB 100 via the SC 200 (step S308).

Next, the GLDB 100 transmits a generic operational parameter to the SC 200 (step S310).

Then, the SC 200 updates the generic operational parameter received from the GLDB 100 on the basis of a subchannelization result in step S306 (step S312). For example, in S306, subdivision from the normal-band channel to the narrow-band channel may be performed, and in step S312, maximum allowable transmission power and a spectrum mask in the narrow-band channel may be updated.

Then, the SC 200 transmits the updated generic operational parameter to the communication node included in the master CRS 300A (step S314).

Next, the communication node included in the master CRS 300A broadcasts a notification signal including the updated generic operational parameter (step S316).

In a case where the information provided from the GLDB 100 has been updated

Figure 17:
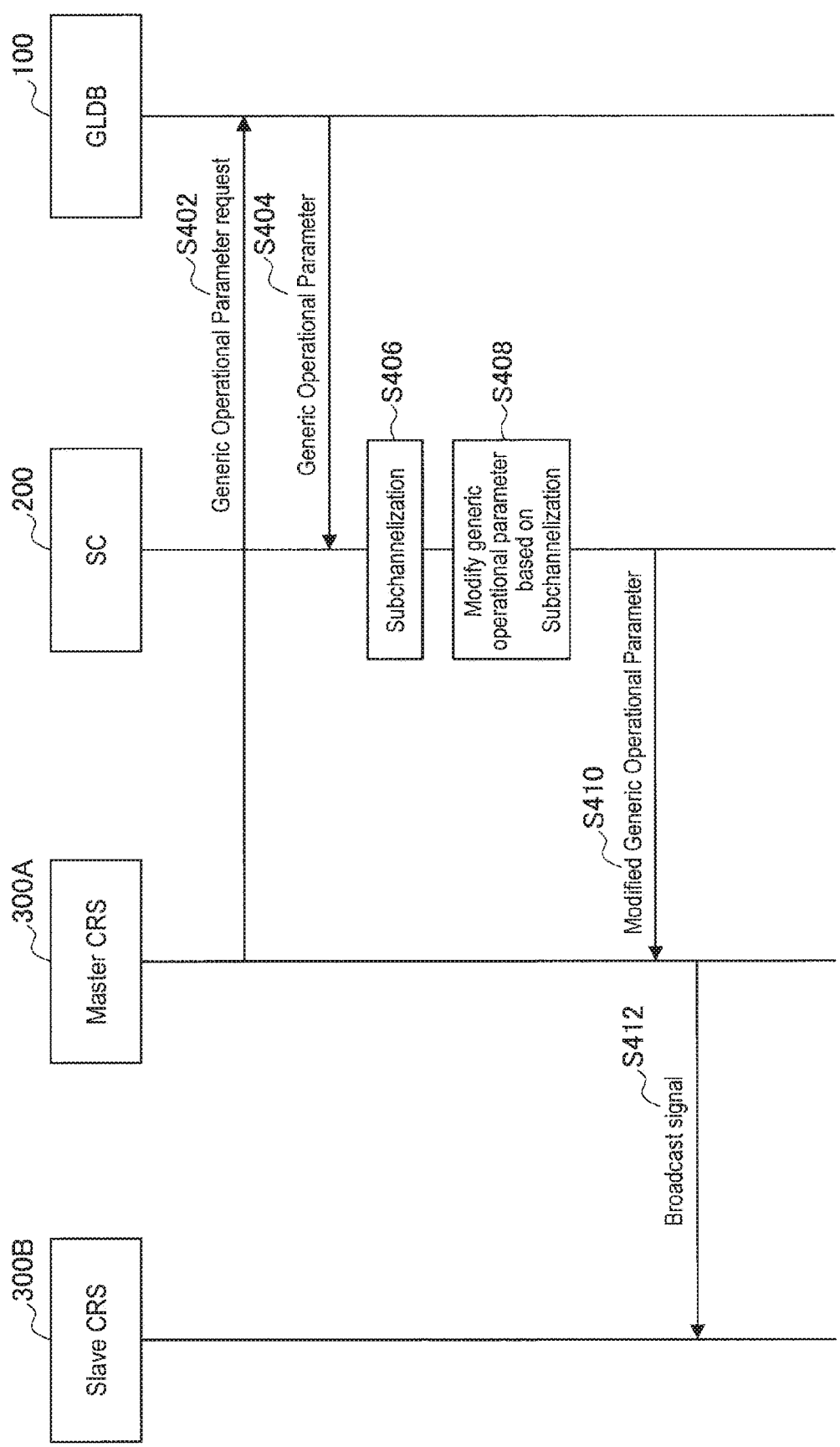
FIG. 17 is a sequence diagram showing an example of a flow of the subchannelization processing executed in the system according to the present embodiment.

FIG. 17 is a sequence diagram showing an example of a flow of the subchannelization processing executed in the system 1 according to the present embodiment. This sequence involves the slave CRS 300B, the master CRS 300A, the SC 200, and the GLDB 100. Note that a communication node included in the master CRS 300A is, for example, the base station 3000. A communication node included in the slave CRS 300B is, for example, the terminal device 4000.

As shown in FIG. 17, first, the communication node included in the master CRS 300A transmits a generic operational parameters request to the GLDB 100 via the SC 200 (step S402).

Next, the GLDB 100 transmits a generic operational parameter to the SC 200 (step S404).

Next, the SC 200 performs subchannelization on the basis of the received generic operational parameter (step 406). It is assumed that the generic operational parameter received here is different from one that has been previously received.

Then, the SC 200 updates the generic operational parameter received from the GLDB 100 on the basis of a subchannelization result in step S406 (step S408). For example, in S406, subdivision from the normal-band channel to the narrow-band channel may be performed, and in step S408, maximum allowable transmission power and a spectrum mask in the narrow-band channel may be updated.

Then, the SC 200 transmits the updated generic operational parameter to the communication node included in the master CRS 300A (step S410).

Next, the communication node included in the master CRS 300A broadcasts a notification signal including the updated generic operational parameter (step S412).

<<4. Implementation Example>>

The logical functional entity of the system 1 whose example has been shown in FIG. 7 may be implemented in various ways. Hereinafter, an architecture according to another implementation will be described with reference to FIGS. 18 to 20.

Advanced CRS

Figure 18:
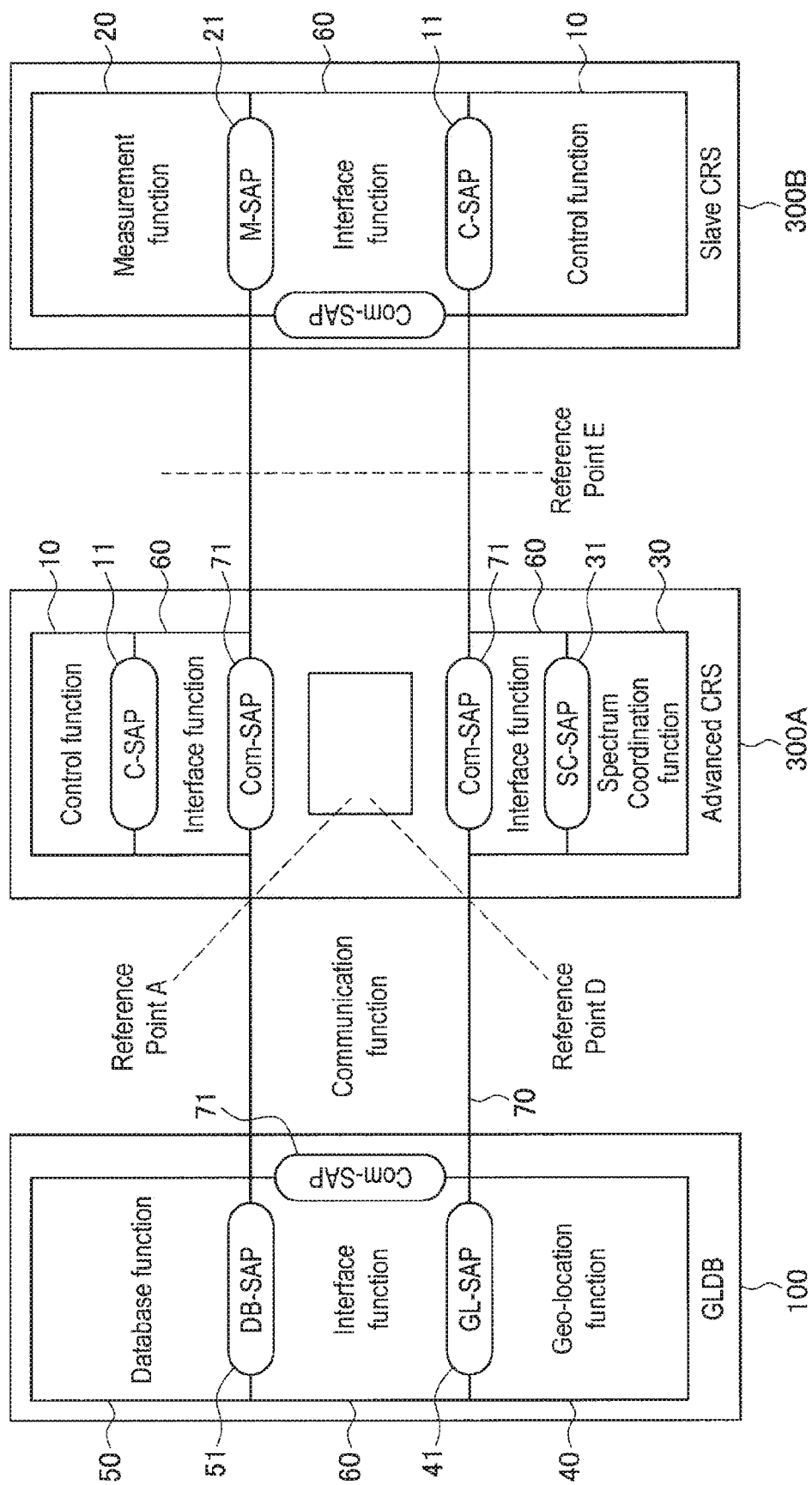
FIG. 18 is a view for explaining another implementation example of a logical functional entity according to the present embodiment.

FIG. 18 is a view for explaining another implementation example of the logical functional entity according to the present embodiment. In the architecture shown in FIG. 18, the logical functional entity of the system 1 is mapped to the GLDB 100, an advanced CRS 300A, and the slave CRS 300B. Here, the advanced CRS is a CRS 300 having a function as the SC 200.

The geo-location function 40, the database function 50, the interface function 60, and the communication function 70 are mapped to the GLDB 100. The control function 10, the spectrum coordination function 30, the interface function 60, and the communication function 70 are mapped to the advanced CRS 300A. The control function 10, the measurement function 20, the interface function 60, and the communication function 70 are mapped to the slave CRS 300B. Furthermore, the reference point A and the reference point D are mapped between the GLDB 100 and the advanced CRS 300A. The reference point E is mapped between the advanced CRS 300A and the slave CRS 300B.

Here, referring to FIG. 18, the interface function 60 and the communication function 70 are interposed between the control function 10 and the spectrum coordination function 30 inside the advanced CRS 300A. The configuration of the advanced CRS 300A is not limited to this example, and as shown in FIG. 19, only the interface function 60 may be interposed between the control function 10 and the spectrum coordination function 30.

Figure 19:
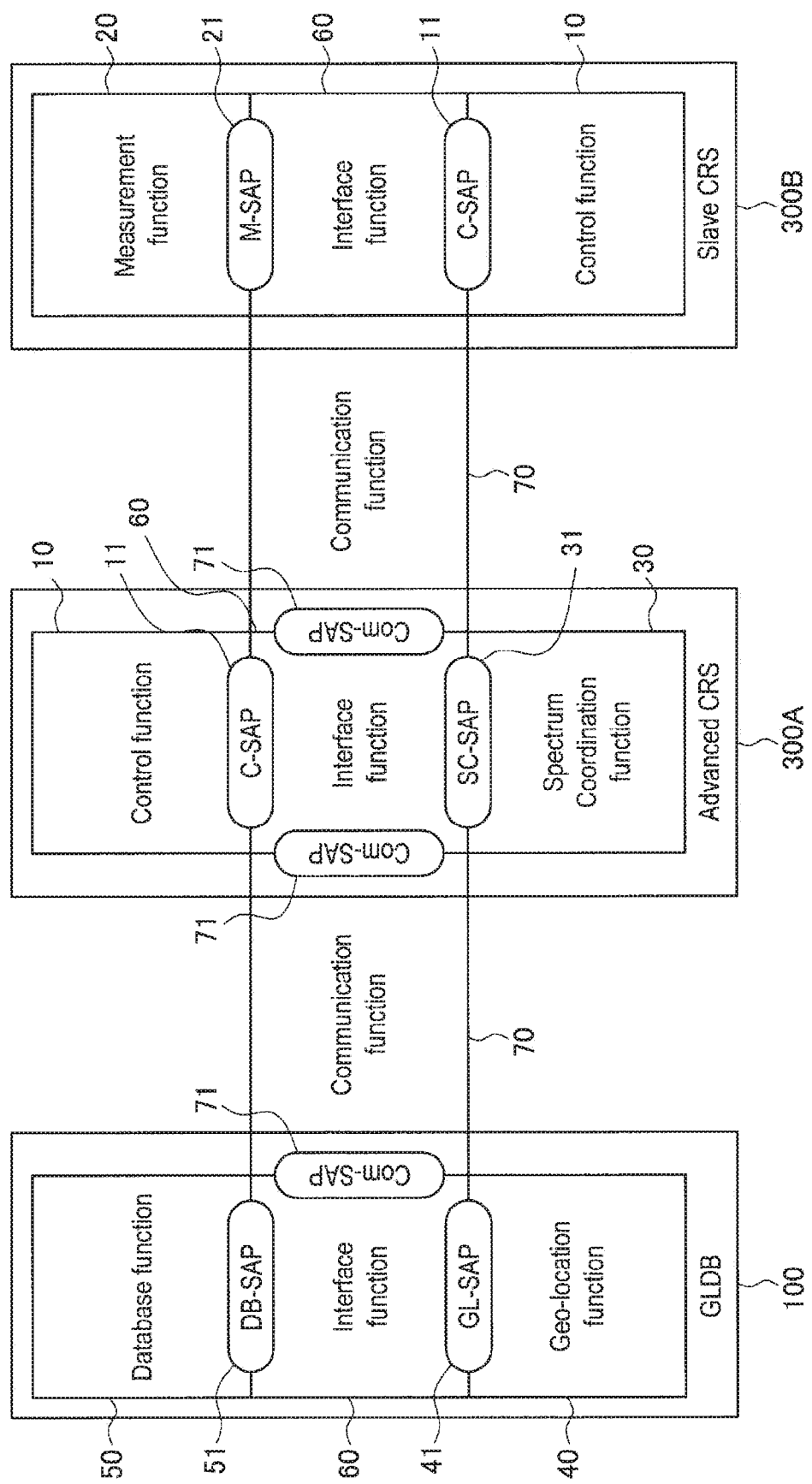
FIG. 19 is a view for explaining another implementation example of the logical functional entity according to the present embodiment.

FIG. 19 is a view for explaining another implementation example of the logical functional entity according to the present embodiment. The architecture shown in FIG. 19 differs from the architecture shown in FIG. 18 in that only the interface function 60 is interposed between the control function 10 and the spectrum coordination function 30 in the configuration of the advanced CRS 300A. Other configurations are similar, therefore the detailed description is omitted here.

Third Party Database

For example, a mechanism may be performed in which a regulatory authority manages a regulatory database that provides primary system information (incumbent information), and a third party operates a white space database (WSDB) that provides available frequency information to the CRS 300. In such a case, the SC 200 can be implemented as a unique function of the WSDB. In other words, the SC 200 may be included in the frequency supervising database to be implemented. An example of the architecture in this case will be described with reference to FIG. 20.

Figure 20:
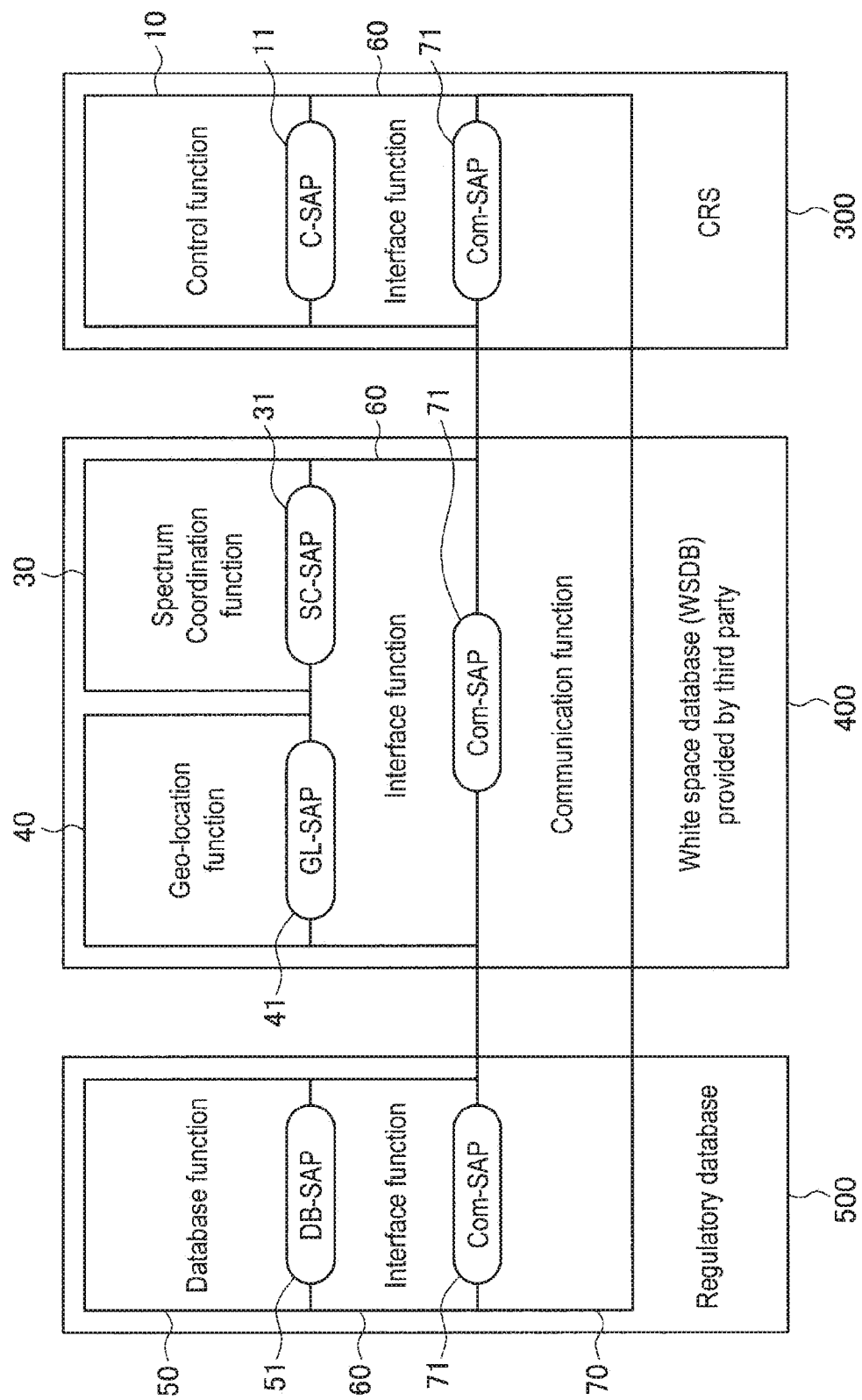
FIG. 20 is a view for explaining another implementation example of the logical functional entity according to the present embodiment.

FIG. 20 is a view for explaining another implementation example of the logical functional entity according to the present embodiment. In the architecture shown in FIG. 20, the logical functional entity of the system 1 is mapped to a regulatory database 500, the WSDB 400, and the CRS 300.

The database function 50, the interface function 60, and the communication function 70 are mapped to the regulatory database 500. The spectrum coordination function 30, the geo-location function 40, the interface function 60, and the communication function 70 are mapped to the WSDB 400. The control function 10, the interface function 60, and the communication function 70 are mapped to the CRS 300.

<<5. Application Example>>

The technology according to the present disclosure can be applied to various products. For example, the network manager 2000 may be realized as any type of server such as a tower server, a rack server, or a blade server. Furthermore, the network manager 2000 may be a control module mounted on a server (e.g., an integrated circuit module configured with one die, or a card or a blade to be inserted into a slot of a blade server).

Furthermore, for example, the base station 3000 may be realized as any type of evolved node B (eNB) such as a macro eNB or a small eNB. The small eNB may be an eNB that covers a cell smaller than a macro cell, such as a pico eNB, a micro eNB, or a home (femto) eNB. Alternatively, the base station 3000 may be realized as another type of base station such as a Node B or a base transceiver station (BTS). The base station 3000 may include a main body (also referred to as a base station apparatus) that controls wireless communication, and one or more remote radio heads (RRHs) disposed at a location different from the main body. Furthermore, various types of terminals as described later may operate as the base station 3000 by temporarily or semi-permanently executing a base station function.

Furthermore, for example, the terminal device 4000 may be realized as a mobile terminal such as a smartphone, a tablet personal computer (PC), a notebook PC, a portable game terminal, a portable/dongle mobile router, or a digital camera, or an in-vehicle terminal such as a car navigation device. Furthermore, the terminal device 4000 may be realized as a terminal (also referred to as a machine type communication (MTC) terminal) that performs machine to machine (M2M) communication. Moreover, the terminal device 4000 may be a wireless communication module (e.g., an integrated circuit module configured with one die) mounted on these terminals.

<5.1. Application Example Related to Network Manager>

Figure 21:
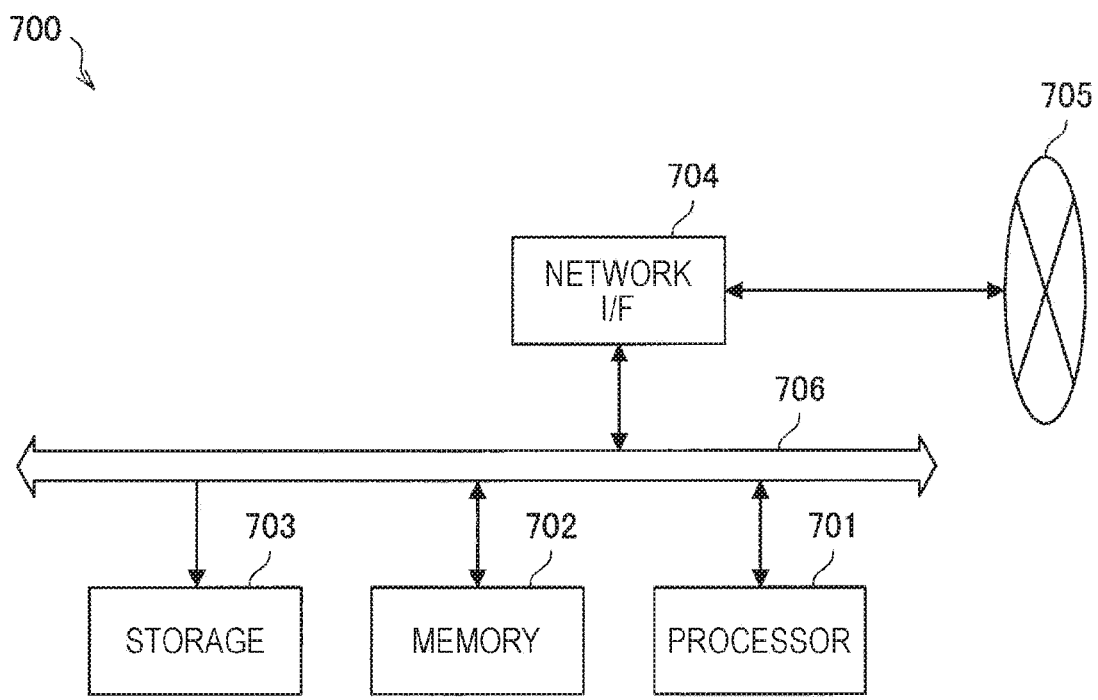
FIG. 21 is a block diagram showing an example of a schematic configuration of a server.

FIG. 21 is a block diagram showing an example of a schematic configuration of a server 700 to which the technology according to the present disclosure can be applied. The server 700 includes a processor 701, a memory 702, a storage 703, a network interface 704, and a bus 706.

The processor 701 may be, for example, a central processing unit (CPU) or a digital signal processor (DSP), and controls various functions of the server 700. The memory 702 includes a random access memory (RAM) and a read only memory (ROM), and stores a program to be executed by the processor 701, and data. The storage 703 may include a storage medium such as a semiconductor memory or a hard disk.

The network interface 704 is a wired communication network to connect the server 700 to a wired communication network 705. The wired communication network 705 may be a core network such as an evolved packet core (EPC), or may be a packet data network (PDN) such as the Internet.

The bus 706 connects the processor 701, the memory 702, the storage 703, and the network interface 704 to one another. The bus 706 may include two or more buses of different speeds (e.g., a high speed bus and a low speed bus).

In the server 700 shown in FIG. 21, one or more components (control unit 2030) included in the network manager 2000 described with reference to FIG. 4 may be implemented in the processor 701. As an example, a program for causing a processor to function as the one or more components (in other words, a program for causing a processor to execute an operation of the one or more components) may be installed in the server 700, and the processor 701 may execute the program. As another example, the server 700 may be mounted with a module including the processor 701 and the memory 702, and the one or more components may be implemented in the module. In this case, the module may store a program for causing a processor to function as the one or more components in the memory 702, and the program may be executed by the processor 701. As described above, the server 700 or the module may be provided as a device including the one or more components, and the program for causing a processor to function as the one or more components may be provided. Furthermore, a readable recording medium that has recorded the program may be provided.

Furthermore, in the server 700 shown in FIG. 21, for example, the network communication unit 2010 described with reference to FIG. 4 may be implemented in the network interface 704. Furthermore, the storage unit 2020 may be implemented in the memory 702 and/or the storage 703.

<5.2. Application Example Related to Base Station>

(First Application Example)

Figure 22:
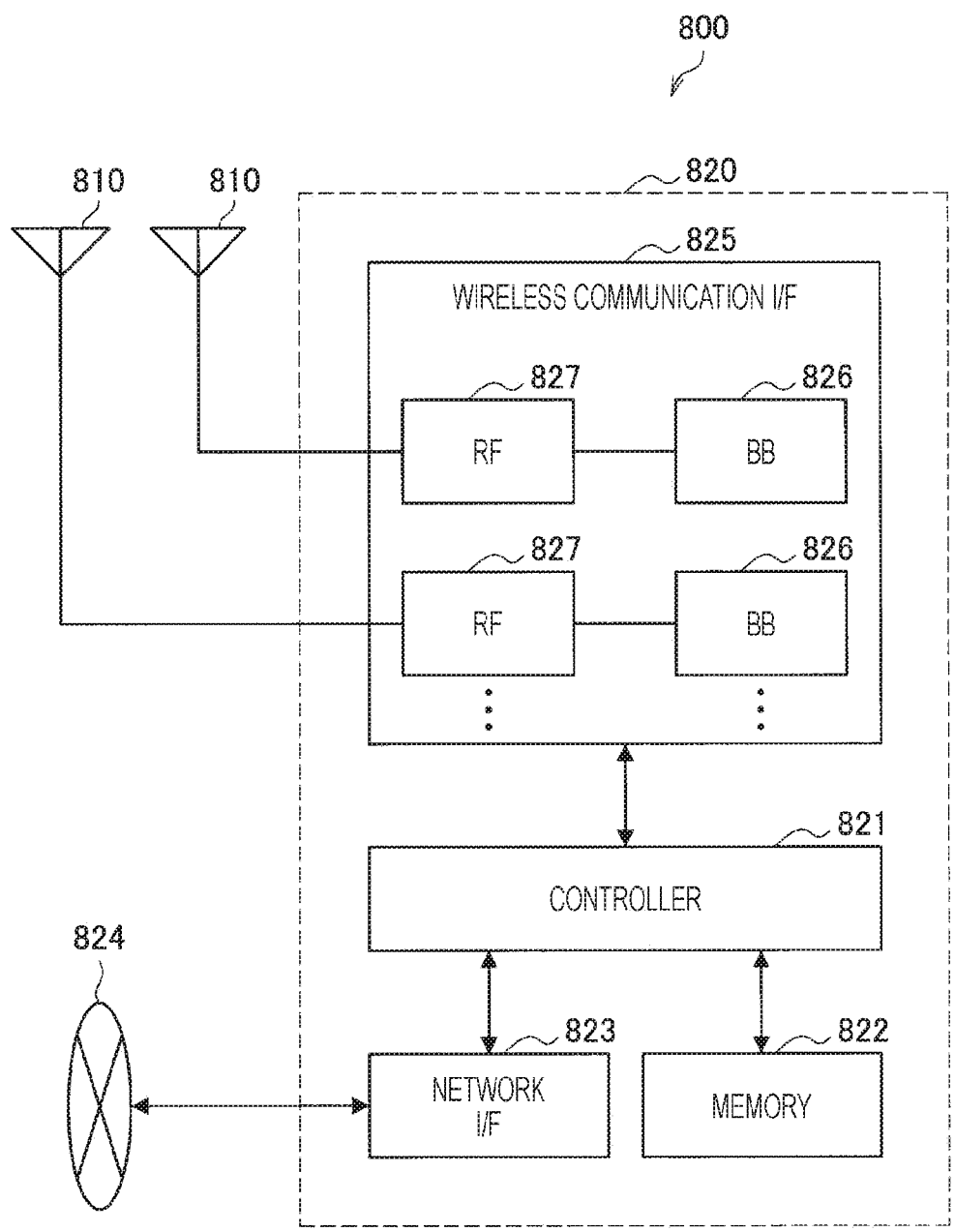
FIG. 22 is a block diagram showing a first example of a schematic configuration of an eNB.

FIG. 22 is a block diagram showing a first example of a schematic configuration of an eNB to which the technology of the present disclosure may be applied. The eNB 800 has one or more antennas 810 and a base station apparatus 820. Each antenna 810 and the base station apparatus 820 may be connected to each other via an RF cable.

Each of the antennas 810 has a single or a plurality of antenna elements (e.g., a plurality of antenna elements forming a MIMO antenna), and is used for transmission and reception of a radio signal by the base station apparatus 820. The eNB 800 may have a plurality of antennas 810 as shown in FIG. 22, and the plurality of antennas 810 may individually correspond to, for example, a plurality of frequency bands used by the eNB 800. Note that FIG. 22 shows an example in which the eNB 800 has a plurality of antennas 810, but the eNB 800 may have a single antenna 810.

The base station apparatus 820 includes a controller 821, a memory 822, a network interface 823, and a wireless communication interface 825.

The controller 821 may be, for example, a CPU or a DSP, and operates various functions of a higher-level layer of the base station apparatus 820. For example, the controller 821 generates a data packet from data in a signal processed by the wireless communication interface 825, and transfers the generated packet via the network interface 823. The controller 821 may generate a bundled packet by bundling data from a plurality of baseband processors, and transfer the generated bundled packet. Furthermore, the controller 821 may have a logical function that executes control such as radio resource management, radio bearer control, mobility management, admission control, or scheduling. Furthermore, the control may be executed in cooperation with a peripheral eNB or a core network node. The memory 822 includes a RAM and a ROM, and stores a program to be executed by the controller 821 and various control data (e.g., a terminal list, transmission power data, scheduling data, and the like).

The network interface 823 is a communication interface to connect the base station apparatus 820 to a core network 824. The controller 821 may communicate with a core network node or another eNB via the network interface 823. In that case, the eNB 800 may be connected to the core network node or another eNB by a logical interface (e.g., an S1 interface or an X2 interface). The network interface 823 may be a wired communication interface, or may be a wireless communication interface for a wireless backhaul. In a case where the network interface 823 is a wireless communication interface, the network interface 823 may use a higher frequency band than a frequency band used by the wireless communication interface 825, for wireless communication.

The wireless communication interface 825 supports any of cellular communication methods, such as a long term evolution (LTE) or LTE-Advanced, and provides a wireless connection to a terminal located in a cell of the eNB 800 via the antenna 810. The wireless communication interface 825 may typically include a baseband (BB) processor 826, an RF circuit 827, and the like. The BB processor 826 may perform, for example, encoding/decoding, modulation/demodulation, multiplexing/demultiplexing, and the like, and executes various kinds of signal processing of each layer (e.g., L1, medium access control (MAC), radio link control (RLC), and packet data convergence protocol (PDCP)). The BB processor 826 may have some or all of the logical functions described above instead of the controller 821. The BB processor 826 may be a module including: a memory that stores a communication control program; a processor that executes the program; and related circuits, and the function of the BB processor 826 may be changeable by updating the program. Furthermore, the module may be a card or a blade to be inserted into a slot of the base station apparatus 820, or may be a chip mounted on the card or the blade. Meanwhile, the RF circuit 827 may include a mixer, a filter, an amplifier, and the like, and transmits and receives a radio signal through the antenna 810.

The wireless communication interface 825 may include a plurality of BB processors 826 as shown in FIG. 22, and the plurality of BB processors 826 may individually correspond to a plurality of frequency bands used by the eNB 800, for example. Furthermore, the wireless communication interface 825 includes a plurality of RF circuits 827 as shown in FIG. 22, and the plurality of RF circuits 827 may individually correspond to, for example, a plurality of antenna elements. Note that FIG. 22 shows an example in which the wireless communication interface 825 includes a plurality of BB processors 826 and a plurality of RF circuits 827, but the wireless communication interface 825 may include a single BB processor 826 or a single RF circuit 827.

In the eNB 800 shown in FIG. 22, one or more components (control unit 3050) included in the base station 3000 described with reference to FIG. 5 may be implemented in the wireless communication interface 825. Alternatively, at least some of these components may be implemented in the controller 821. As one example, the eNB 800 may be mounted with a module including a part (e.g., the BB processor 826) or all of the wireless communication interface 825 and/or the controller 821, and the one or more components may be implemented in the module. In this case, the module may store a program for causing a processor to function as the one or more components (in other words, a program for causing a processor to execute an operation of the one or more components), and may execute the program. As another example, a program for causing a processor to function as the one or more components may be installed in the eNB 800, and the wireless communication interface 825 (e.g., the BB processor 826) and/or the controller 821 may execute the program. As described above, the eNB 800, the base station apparatus 820, or the module may be provided as a device including the one or more components, and a program for causing a processor to function as the one or more components may be provided. Furthermore, a readable recording medium that has recorded the program may be provided.

Furthermore, in the eNB 800 shown in FIG. 22, the wireless communication unit 3020 described with reference to FIG. 5 may be implemented in the wireless communication interface 825 (e.g., the RF circuit 827). Furthermore, the antenna unit 3010 may be implemented in the antenna 810. Furthermore, the network communication unit 3030 may be implemented in the controller 821 and/or the network interface 823. Furthermore, the storage unit 3040 may be implemented in the memory 822.

(Second Application Example)

Figure 23:
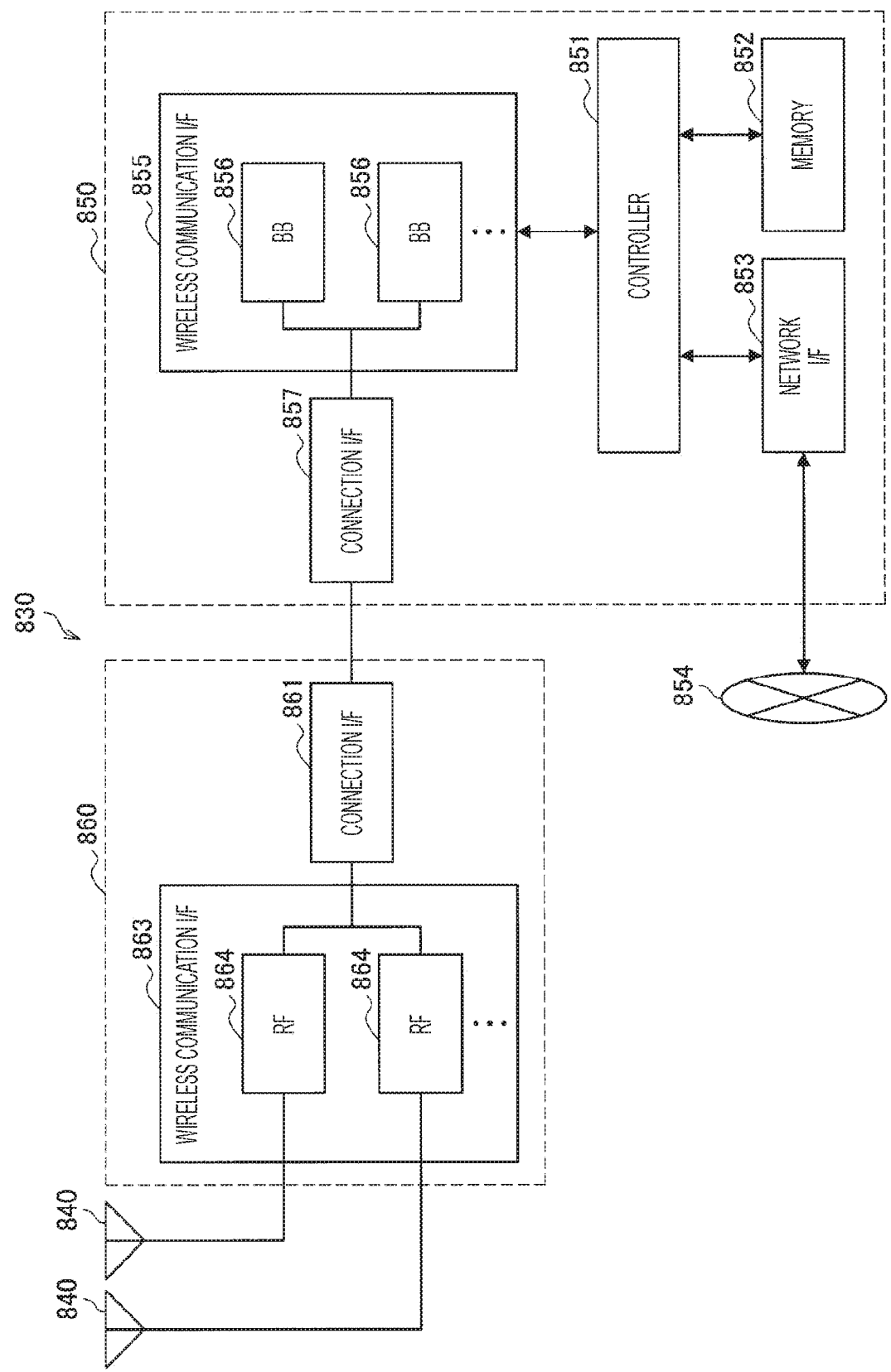
FIG. 23 is a block diagram showing a second example of a schematic configuration of the eNB.

FIG. 23 is a block diagram showing a second example of a schematic configuration of an eNB to which the technology of the present disclosure may be applied. The eNB 830 includes one or more antennas 840, a base station apparatus 850, and an RRH 860. Each antenna 840 and the RRH 860 may be connected to each other via an RF cable. Furthermore, the base station apparatus 850 and the RRH 860 may be connected to each other by a high-speed line such as an optical fiber cable.

Each of the antennas 840 has a single or a plurality of antenna elements (e.g., a plurality of antenna elements forming a MIMO antenna), and is used for transmission and reception of a radio signal by the RRH 860. The eNB 830 may have a plurality of antennas 840 as shown in FIG. 23, and the plurality of antennas 840 may individually correspond to, for example, a plurality of frequency bands used by the eNB 830. Note that FIG. 23 shows an example in which the eNB 830 has a plurality of antennas 840, but the eNB 830 may have a single antenna 840.

The base station apparatus 850 includes a controller 851, a memory 852, a network interface 853, a wireless communication interface 855, and a connection interface 857. The controller 851, the memory 852, and the network interface 853 are similar to the controller 821, the memory 822, and the network interface 823 described with reference to FIG. 22.

The wireless communication interface 855 supports any of cellular communication methods, such as LTE or LTE-Advanced, and provides a wireless connection to a terminal located in a sector corresponding to the RRH 860 via the RRH 860 and the antenna 840. The wireless communication interface 855 may typically include a BB processor 856 or the like. The BB processor 856 is similar to the BB processor 826 described with reference to FIG. 22 except that connection is made to an RF circuit 864 of the RRH 860 via the connection interface 857. The wireless communication interface 855 may include a plurality of BB processors 856 as shown in FIG. 23, and the plurality of BB processors 856 may individually correspond to a plurality of frequency bands used by the eNB 830, for example. Note that FIG. 23 shows an example in which the wireless communication interface 855 includes a plurality of BB processors 856, but the wireless communication interface 855 may include a single BB processor 856.

The connection interface 857 is an interface to connect the base station apparatus 850 (wireless communication interface 855) to the RRH 860. The connection interface 857 may be a communication module for communication on a high-speed line that connects the base station apparatus 850 (wireless communication interface 855) and the RRH 860.

Furthermore, the RRH 860 also includes a connection interface 861 and a wireless communication interface 863.

The connection interface 861 is an interface to connect the RRH 860 (wireless communication interface 863) to the base station apparatus 850. The connection interface 861 may be a communication module for communication on a high-speed line.

The wireless communication interface 863 transmits and receives a radio signal via the antenna 840. The wireless communication interface 863 may typically include the RF circuit 864 and the like. The RF circuit 864 may include a mixer, a filter, an amplifier, and the like, and transmits and receives a radio signal through the antenna 840. The wireless communication interface 863 includes a plurality of RF circuits 864 as shown in FIG. 23, and the plurality of RF circuits 864 may individually correspond to, for example, a plurality of antenna elements. Note that FIG. 23 shows an example in which the wireless communication interface 863 includes a plurality of RF circuits 864, but the wireless communication interface 863 may include a single RF circuit 864.

In the eNB 830 shown in FIG. 23, one or more components (control unit 3050) included in the base station 3000 described with reference to FIG. 5 may be implemented in the wireless communication interface 855 and/or the wireless communication interface 863. Alternatively, at least some of these components may be implemented in the controller 851. As an example, the eNB 830 may be mounted with a module including a part (e.g., the BB processor 856) or all of the wireless communication interface 855, and/or the controller 851, and the one or more components may be implemented in the module. In this case, the module may store a program for causing a processor to function as the one or more components (in other words, a program for causing a processor to execute an operation of the one or more components), and may execute the program. As another example, a program for causing a processor to function as the one or more components may be installed in the eNB 830, and the wireless communication interface 855 (e.g., the BB processor 856) and/or the controller 851 may execute the program. As described above, the eNB 830, the base station apparatus 850, or the module may be provided as a device including the one or more components, and a program for causing a processor to function as the one or more components may be provided. Furthermore, a readable recording medium that has recorded the program may be provided.

Furthermore, in the eNB 830 shown in FIG. 23, for example, the wireless communication unit 3020 described with reference to FIG. 5 may be implemented in the wireless communication interface 863 (e.g., the RF circuit 864). Furthermore, the antenna unit 3010 may be implemented in the antenna 840. Furthermore, the network communication unit 3030 may be implemented in the controller 851 and/or the network interface 853. Furthermore, the storage unit 3040 may be implemented in the memory 852.

<5.3. Application Example Related to Terminal Device>
(First Application Example)

Figure 24:
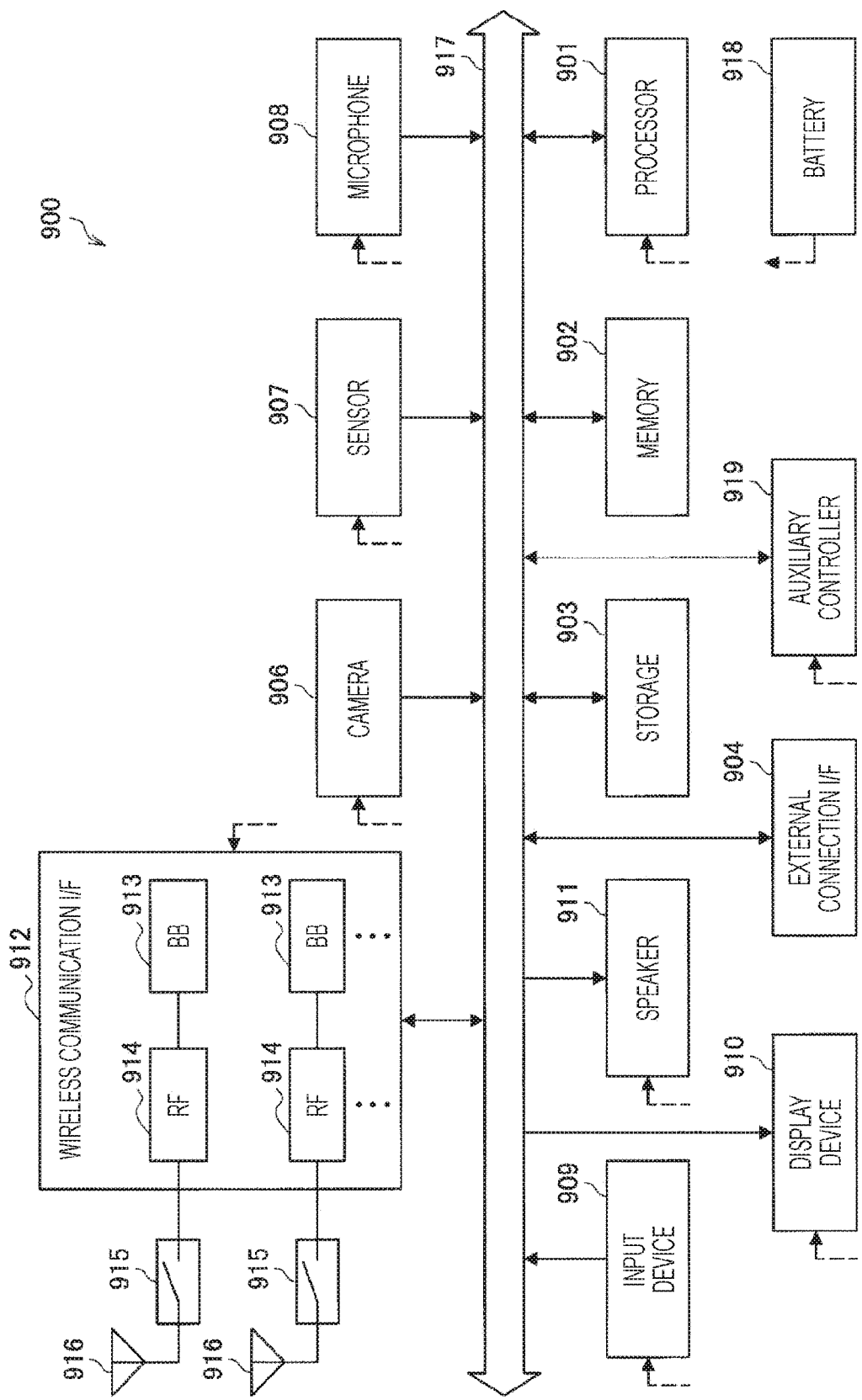
FIG. 24 is a block diagram showing an example of a schematic configuration of a smartphone.

FIG. 24 is a block diagram showing an example of a schematic configuration of a smartphone 900 to which the technology according to the present disclosure can be applied. The smartphone 900 includes a processor 901, a memory 902, a storage 903, an external connection interface 904, a camera 906, a sensor 907, a microphone 908, an input device 909, a display device 910, a speaker 911, a wireless communication interface 912, one or more antenna switches 915, one or more antennas 916, a bus 917, a battery 918, and an auxiliary controller 919.

The processor 901 may be, for example, a CPU or a system on chip (SoC), and controls functions of an application layer and other layers of the smartphone 900. The memory 902 includes a RAM and a ROM, and stores a program to be executed by the processor 901, and data. The storage 903 may include a storage medium such as a semiconductor memory or a hard disk. The external connection interface 904 is an interface to connect an external device such as a memory card or a universal serial bus (USB) device to the smartphone 900.

The camera 906 includes an imaging element such as, for example, a charge coupled device (CCD) or a complementary metal oxide semiconductor (CMOS), and generates a captured image. The sensor 907 may include, for example, a sensor group such as a positioning sensor, a gyro sensor, a geomagnetic sensor, and an acceleration sensor. The microphone 908 converts audio inputted to the smartphone 900 into an audio signal. The input device 909 includes, for example, a touch sensor that detects a touch on a screen of the display device 910, a keypad, a keyboard, a button, a switch, or the like, and accepts an operation or information inputted from the user. The display device 910 has a screen such as a liquid crystal display (LCD) or an organic light emitting diode (OLED) display, and displays an output image of the smartphone 900. The speaker 911 converts an audio signal outputted from the smartphone 900 into audio.

The wireless communication interface 912 supports any of cellular communication methods, such as LTE or LTE-Advanced, and executes wireless communication. The wireless communication interface 912 may typically include a BB processor 913, an RF circuit 914, and the like. The BB processor 913 may perform, for example, encoding/decoding, modulation/demodulation, multiplexing/demultiplexing, and the like, and execute various kinds of signal processing for wireless communication. Meanwhile, the RF circuit 914 may include a mixer, a filter, an amplifier, and the like, and transmits and receives a radio signal through the antenna 916. The wireless communication interface 912 may be a one-chip module in which the BB processor 913 and the RF circuit 914 are integrated. The wireless communication interface 912 may include a plurality of BB processors 913 and a plurality of RF circuits 914 as shown in FIG. 24. Note that FIG. 24 shows an example in which the wireless communication interface 912 includes a plurality of BB processors 913 and a plurality of RF circuits 914, but the wireless communication interface 912 may include a single BB processor 913 or a single RF circuit 914.

Moreover, in addition to the cellular communication method, the wireless communication interface 912 may support other types of wireless communication methods such as a short-range wireless communication method, a proximity wireless communication method, and a wireless local area network (LAN) method. In that case, the BB processor 913 and the RF circuit 914 for each wireless communication method may be included.

Each of the antenna switches 915 switches a connection destination of the antenna 916 among a plurality of circuits (e.g., circuits for different wireless communication methods) included in the wireless communication interface 912.

Each of the antennas 916 has a single or a plurality of antenna elements (e.g., a plurality of antenna elements forming a MIMO antenna), and is used for transmission and reception of a radio signal by the wireless communication interface 912. The smartphone 900 may have a plurality of antennas 916 as shown in FIG. 24. Note that FIG. 24 shows an example in which the smartphone 900 has a plurality of antennas 916, but the smartphone 900 may have a single antenna 916.

Moreover, the smartphone 900 may include the antenna 916 for each wireless communication method. In that case, the antenna switch 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 912, and the auxiliary controller 919 to one another. The battery 918 supplies power to each block of the smartphone 900 shown in FIG. 24 through a feed line partially shown by a broken line in the figure. The auxiliary controller 919 causes operation of minimum necessary functions of the smartphone 900, for example, in a sleep mode.

In the smartphone 900 shown in FIG. 24, one or more components (control unit 4040) included in the terminal device 4000 described with reference to FIG. 6 may be implemented in the wireless communication interface 912. Alternatively, at least some of these components may be implemented in the processor 901 or the auxiliary controller 919. As an example, the smartphone 900 may be mounted with a module including a part (e.g., the BB processor 913) or all of the wireless communication interface 912, the processor 901, and/or the auxiliary controller 919, and the one or more components may be implemented in the module. In this case, the module may store a program for causing a processor to function as the one or more components (in other words, a program for causing a processor to execute an operation of the one or more components), and may execute the program. As another example, a program for causing a processor to function as the one or more components may be installed in the smartphone 900, and the wireless communication interface 912 (e.g., the BB processor 913), the processor 901, and/or the auxiliary controller 919 may execute the program. As described above, the smartphone 900 or the module may be provided as a device including the one or more components, and a program for causing a processor to function as the one or more components may be provided. Furthermore, a readable recording medium that has recorded the program may be provided.

Furthermore, in the smartphone 900 shown in FIG. 24, for example, the wireless communication unit 4020 described with reference to FIG. 6 may be implemented in the wireless communication interface 912 (e.g., the RF circuit 914). Furthermore, the antenna unit 4010 may be implemented in the antenna 916. Furthermore, the storage unit 4030 may be implemented in the memory 902.

(Second Application Example)

Figure 25:
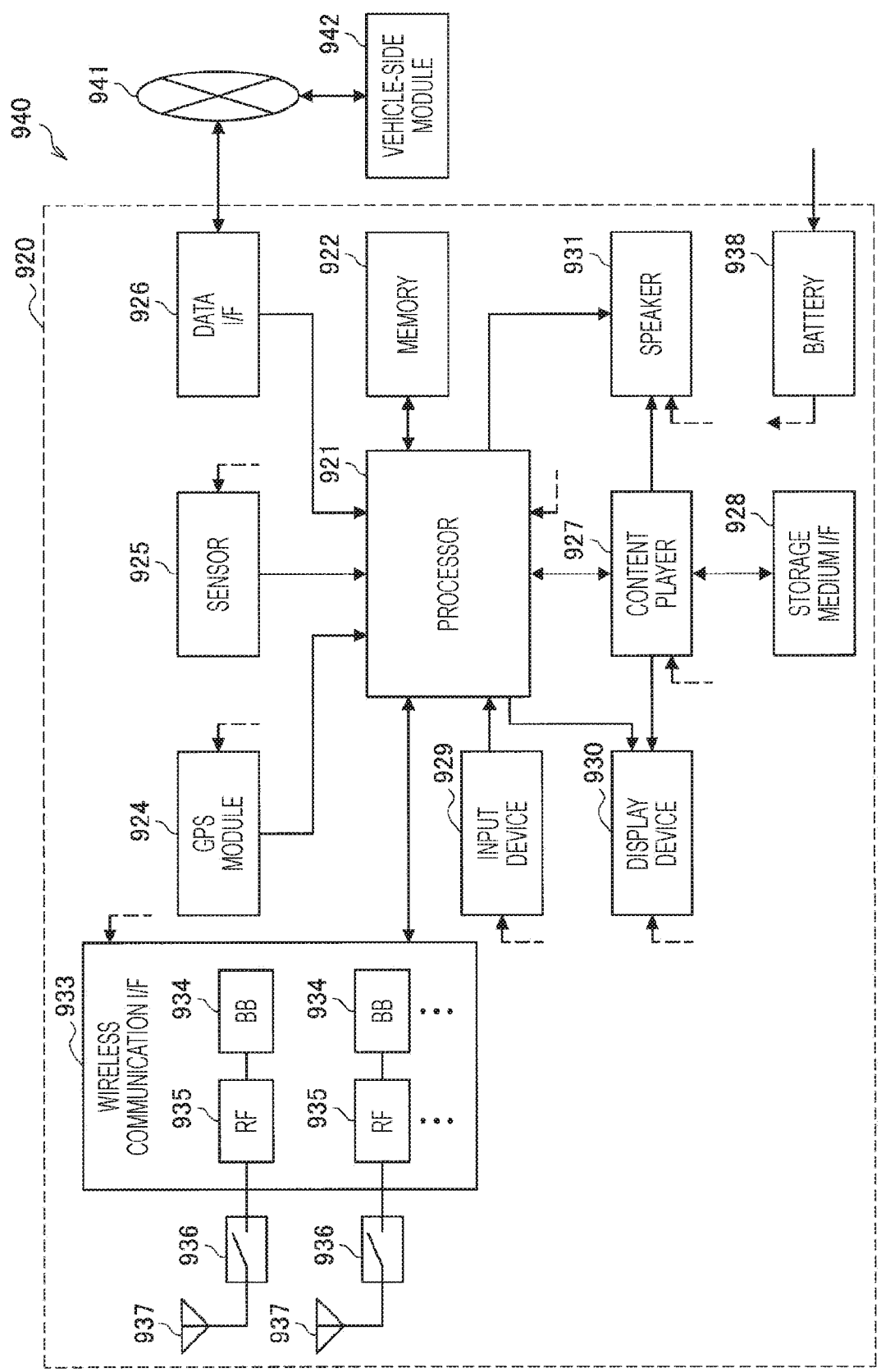
FIG. 25 is a block diagram showing an example of a schematic configuration of a car navigation device.

FIG. 25 is a block diagram showing an example of a schematic configuration of a car navigation device 920 to which the technology according to the present disclosure can be applied. The car navigation device 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, one or more antenna switches 936, one or more antennas 937, and a battery 938.

The processor 921 may be, for example, a CPU or an SoC, and controls a navigation function and other functions of the car navigation device 920. The memory 922 includes a RAM and a ROM, and stores a program to be executed by the processor 921, and data.

The GPS module 924 uses GPS signals received from GPS satellites to measure a location (e.g., latitude, longitude, and altitude) of the car navigation device 920. The sensor 925 may include, for example, a sensor group such as a gyro sensor, a geomagnetic sensor, and an air pressure sensor. The data interface 926 is connected to an in-vehicle network 941 via, for example, a terminal (not shown), and acquires data generated on the vehicle side, such as vehicle speed data.

The content player 927 plays contents stored in a storage medium (e.g., a CD or a DVD) inserted into the storage medium interface 928. The input device 929 includes, for example, a touch sensor that detects a touch on a screen of the display device 930, a button, a switch, or the like, and accepts an operation or an information input from a user. The display device 930 has a screen such as an LCD or an OLED display, and displays an image of a navigation function or reproduced contents. The speaker 931 outputs sound of the navigation function or reproduced contents.

The wireless communication interface 933 supports any of cellular communication methods, such as LTE or LTE-Advanced, and executes wireless communication. The wireless communication interface 933 may typically include a BB processor 934, an RF circuit 935, and the like. The BB processor 934 may perform, for example, encoding/decoding, modulation/demodulation, multiplexing/demultiplexing, and the like, and executes various kinds of signal processing for wireless communication. Meanwhile, the RF circuit 935 may include a mixer, a filter, an amplifier, and the like, and transmits and receives a radio signal through the antenna 937. The wireless communication interface 933 may be a one-chip module in which the BB processor 934 and the RF circuit 935 are integrated. The wireless communication interface 933 may include a plurality of BB processors 934 and a plurality of RF circuits 935 as shown in FIG. 25. Note that FIG. 25 shows an example in which the wireless communication interface 933 includes a plurality of BB processors 934 and a plurality of RF circuits 935, but the wireless communication interface 933 may include a single BB processor 934 or a single RF circuit 935.

Moreover, in addition to the cellular communication method, the wireless communication interface 933 may support other types of wireless communication methods such as a short-range wireless communication method, a proximity wireless communication method, and a wireless LAN method. In that case, the BB processor 934 and the RF circuit 935 for each wireless communication method may be included.

Each of the antenna switches 936 switches a connection destination of the antenna 937 among a plurality of circuits (e.g., circuits for different wireless communication methods) included in the wireless communication interface 933.

Each of the antennas 937 has a single or a plurality of antenna elements (e.g., a plurality of antenna elements forming a MIMO antenna), and is used for transmission and reception of a radio signal by the wireless communication interface 933. The car navigation device 920 may have a plurality of antennas 937 as shown in FIG. 25. Note that, FIG. 25 shows an example in which the car navigation device 920 has a plurality of antennas 937, but the car navigation device 920 may have a single antenna 937.

Moreover, the car navigation device 920 may include the antenna 937 for each wireless communication method. In that case, the antenna switch 936 may be omitted from the configuration of the car navigation device 920.

The battery 938 supplies power to each block of the car navigation device 920 shown in FIG. 25 through a feed line partially shown by a broken line in the figure. Furthermore, the battery 938 also accumulates power supplied from the vehicle side.

In the car navigation device 920 shown in FIG. 25, one or more components (control unit 4040) included in the terminal device 4000 described with reference to FIG. 6 may be implemented in the wireless communication interface 933. Alternatively, at least some of these components may be implemented in the processor 921. As an example, the car navigation device 920 may be mounted with a module including a part (e.g., the BB processor 934) or all of the wireless communication interface 933 and/or the processor 921, and the one or more components may be implemented in the module. In this case, the module may store a program for causing a processor to function as the one or more components (in other words, a program for causing a processor to execute an operation of the one or more components), and may execute the program. As another example, a program for causing a processor to function as the one or more components may be installed in the car navigation device 920, and the wireless communication interface 933 (e.g., the BB processor 934) and/or the processor 921 may execute the program. As described above, the car navigation device 920 or the module may be provided as a device including the one or more components, and a program for causing a processor to function as the one or more components may be provided. Furthermore, a readable recording medium that has recorded the program may be provided.

Furthermore, in the car navigation device 920 shown in FIG. 25, for example, the wireless communication unit 4020 described with reference to FIG. 6 may be implemented in the wireless communication interface 933 (e.g., the RF circuit 935). Furthermore, the antenna unit 4010 may be implemented in the antenna 937. Furthermore, the storage unit 4030 may be implemented in the memory 922.

Furthermore, the technology according to the present disclosure may be realized as an in-vehicle system (or vehicle) 940 including one or more blocks of the car navigation device 920 described above, the in-vehicle network 941, and a vehicle-side module 942. The vehicle-side module 942 generates vehicle-side data such as a vehicle speed, an engine speed, or failure information, and outputs the generated data to the in-vehicle network 941.

<<6. Conclusion>>

One embodiment of the present disclosure has been described in detail with reference to FIGS. 1 to 25 above. As described above, the SC 200 according to the present embodiment perform division processing of dividing a first frequency band indicated by a frequency supervising database as a frequency band that can be used by at least one communication node included in the CRS into a plurality of second frequency bands, on the basis of capability information of the communication node and information indicating a measurement result by the communication node. This configuration enables the communication node to secondarily use a narrow-band channel, which has a narrower bandwidth than a normal-band channel indicated as an available frequency band from the frequency supervising database. Therefore, for example, flexibility of channel assignment to a narrow-band WSD is improved, and accordingly, effects such as reduction of system interference and improvement of frequency usage efficiency are expected.

The preferred embodiment of the present disclosure has been described above in detail with reference to the accompanying drawings, but the technical scope of the present disclosure is not limited to such examples. It is obvious that those with ordinary skill in the technical field of the present disclosure can arrive various variations or modifications within the scope of the technical idea described in the claims, and it is naturally understood that these also fall within the technical scope of the present disclosure.

Furthermore, the processing described using the flowchart and the sequence diagram in the present specification may not necessarily be executed in the illustrated order. Several processing steps may be executed in parallel. Furthermore, additional processing steps may be employed, and some processing steps may be omitted.

Furthermore, the effects described in the present specification are merely exemplary or illustrative, and not restrictive. That is, the technology according to the present disclosure can exhibit other effects apparent to those skilled in the art from the description of the present specification, in addition to the effect above or instead of the effect above.

Note that the following configurations are also within the technical scope of the present disclosure.

(1)

A control device including:

a control unit configured to perform division processing of dividing a first frequency band indicated by a frequency supervising database as a frequency band that can be used by at least one communication node, into a plurality of second frequency bands, on the basis of capability information of the communication node and information indicating a measurement result by the communication node.

(2)

The control device according to (1) above, in which, as the division processing, the control unit determines at least one of: a bandwidth and a center frequency of each of the second frequency bands; a lower limit frequency and an upper limit frequency of each of the second frequency bands; or an interval between the second frequency bands that are adjacent to each other.

(3)

The control device according to (2) above, in which, as the division processing, the control unit determines a spectrum mask of each of the second frequency bands.

(4)

The control device according to (3) above, in which, as the division processing, the control unit determines maximum allowable transmission power associated with each of the second frequency bands.

(5)

The control device according to any one of (1) to (4) above, in which the control unit performs the division processing on the basis of position information of the communication node.

(6)

The control device according to any one of (1) to (5) above, in which the control unit performs the division processing on the basis of information indicating maximum allowable transmission power associated with the first frequency band.

(7)

The control device according to any one of (1) to (6) above, in which the control unit notifies the communication node of information indicating a result of the division processing.

(8)

The control device according to any one of (1) to (7) above, in which the control unit performs the division processing again in a case where information indicating the measurement result has been newly acquired.

(9)

The control device according to any one of (1) to (8) above, in which the control unit performs the division processing again in a case where information provided from the frequency supervising database has been updated.

(10)

The controller according to any one of (1) to (9) above, in which the control device is included in the frequency supervising database.

(11)

A base station that communicates with a terminal device, the base station including:

a control unit configured to notify a control device of capability information of the terminal device, and acquire, from the control device, information indicating a result of division processing of dividing a first frequency band indicated by a frequency supervising database as a frequency band that can be used by the base station, into a plurality of second frequency bands, to notify the terminal device.

(12)
The base station according to (11) above, in which the control unit notifies the control device of capability information of the base station.

(13)
The base station according to (11) or (12) above, in which the control unit performs the division processing.

(14)
A terminal device that communicates with a base station, the terminal device including:
a control unit configured to: acquire information indicating a result of division processing of dividing a first frequency band indicated by a frequency supervising database as a frequency band that can be used by the base station, into a plurality of second frequency bands; perform measurement processing on at least one of the plurality of second frequency bands; and report information indicating a measurement result to the base station.

(15)
A method to be executed by a processor, the method including:
performing division processing of dividing a first frequency band indicated by a frequency supervising database as a frequency band that can be used by at least one communication node, into a plurality of second frequency bands, on the basis of capability information of the communication node and information indicating a measurement result by the communication node.

(16)
A method to be executed by a base station that communicates with a terminal device,
the method including:
notifying a control device of capability information of the terminal device, and acquiring, from the control device, information indicating a result of division processing of dividing a first frequency band indicated by a frequency supervising database as a frequency band that can be used by the base station, into a plurality of second frequency bands, to notify the terminal device.

(17)
A method to be executed by a terminal device that communicates with a base station,
the method including:
acquiring information indicating a result of division processing of dividing a first frequency band indicated by a frequency supervising database as a frequency band that can be used by the base station, into a plurality of second frequency bands; performing measurement processing on at least one of the plurality of second frequency bands; and reporting information indicating a measurement result to the base station.

(18)
A recording medium that has recorded a program for causing
a computer to function as
a control unit configured to perform division processing of dividing a first frequency band indicated by a frequency supervising database as a frequency band that can be used by at least one communication node, into a plurality of second frequency bands, on the basis of capability information of the communication node and information indicating a measurement result by the communication node.

(19)
A recording medium that has recorded a program for causing
a computer to function as
a control unit configured to notify a control device of capability information of a terminal device, and acquire, from the control device, information indicating a result of division processing of dividing a first frequency band indicated by a frequency supervising database as a frequency band that can be used by a base station that communicates with the terminal device, into a plurality of second frequency bands, to notify the terminal device.

(20)
A recording medium that has recorded a program for causing
a computer to function as
a control unit configured to: acquire information indicating a result of division processing of dividing a first frequency band indicated by a frequency supervising database as a frequency band that can be used by a base station, into a plurality of second frequency bands; perform measurement processing on at least one of the plurality of second frequency bands; and report information indicating a measurement result to the base station.

REFERENCE SIGNS LIST

1 System
10 Control function
20 Measurement function
30 Spectrum coordination function
40 Geo-location function
50 Database function
60 Interface function
70 Communication function
100 GLDB (Geolocation Database)
200 SC(Spectrum Coordinator)
300 CRS(Cognitive Radio System)
1000 Frequency supervising database
2000 Network manager
3000 Base station
4000 Terminal device

The invention claimed is:
1. A control device, comprising:
a control unit configured to:
divide a first frequency band into a plurality of second frequency bands based on capability information of a communication node and first information indicating a first measurement result by the communication node, wherein
the first information includes at least one of a reference signal received power (RSRP) associated with the communication node, a received signal strength indicator (RSSI) associated with the communication node, a reference signal received quality (RSRQ) associated with the communication node, or an interference power per narrow-band channel associated with the communication node,
the first frequency band is indicated by a frequency supervising database, and
the first frequency band is used by the communication node; and
determine a bandwidth and a center frequency of each of the plurality of second frequency bands.

2. The control device according to claim 1, wherein the control unit is further configured to determine at least one of a lower limit frequency and an upper limit frequency of each of the plurality of second frequency bands or an interval between two frequency bands of the plurality of second frequency bands that are adjacent to each other.

3. The control device according to claim 2, wherein the control unit is further configured to determine a spectrum mask of each of the plurality of second frequency bands.

4. The control device according to claim 3, wherein the control unit is further configured to determine maximum allowable transmission power associated with each of the plurality of second frequency bands.

5. The control device according to claim 1, wherein the control unit is further configured to divide the first frequency band into the plurality of second frequency bands based on position information of the communication node.

6. The control device according to claim 1, wherein the control unit is further configured to divide the first frequency band into the plurality of second frequency bands based on information indicating maximum allowable transmission power associated with the first frequency band.

7. The control device according to claim 1, wherein the control unit is further configured to notify the communication node of information indicating a result of the division of the first frequency band.

8. The control device according to claim 1, wherein the control unit is further configured to divide the first frequency band into the plurality of second frequency bands based on second information indicating a second measurement result.

9. The control device according to claim 1, wherein the control unit is further configured to divide the first frequency band into the plurality of second frequency bands based on updation of information from the frequency supervising database.

10. The control device according to claim 1, wherein the control device is included in the frequency supervising database.

11. A method to be executed by a processor, the method comprising:
dividing a first frequency band into a plurality of second frequency bands based on capability information of a communication node and information indicating a measurement result by the communication node, wherein
the information includes at least one of a reference signal received power (RSRP) associated with the communication node, a received signal strength indicator (RSSI) associated with the communication node, a reference signal received quality (RSRQ) associated with the communication node, or an interference power per narrow-band channel associated with the communication node,
the first frequency band is indicated by a frequency supervising database, and
the first frequency band is used by the communication node; and
determining a bandwidth and a center frequency of each of the plurality of second frequency bands.

12. A non-transitory computer-readable medium having stored thereon computer-executable instructions that, when executed by a processor, cause the processor to execute operations, the operations comprising:
dividing a first frequency band into a plurality of second frequency bands based on capability information of a communication node and information indicating a measurement result by the communication node, wherein
the information includes at least one of a reference signal received power (RSRP) associated with the communication node, a received signal strength indicator (RSSI) associated with the communication node, a reference signal received quality (RSRQ) associated with the communication node, or an interference power per narrow-band channel associated with the communication node,
the first frequency band is indicated by a frequency supervising database, and
the first frequency band is used by the communication node; and
determining a bandwidth and a center frequency of each of the plurality of second frequency bands.

13. A control device, comprising:
a control unit configured to:
divide a first frequency band into a plurality of second frequency bands based on position information of a communication node and at least one of capability information of the communication node or information indicating a measurement result by the communication node,
wherein the first frequency band is indicated by a frequency supervising database and the first frequency band is used by the communication node; and
determine a bandwidth and a center frequency of each of the plurality of second frequency bands.

* * * * *